US012391893B2

(12) United States Patent
Ackerson et al.

(10) Patent No.: US 12,391,893 B2
(45) Date of Patent: Aug. 19, 2025

(54) SUSTAINABLE DIESEL PRODUCTION FROM LIGNINS

(71) Applicant: Duke Technologies, LLC, Fayetteville, AR (US)

(72) Inventors: Michael D. Ackerson, Fayetteville, AR (US); Michael Steven Byars, Fayetteville, AR (US); Kyle Ackerson, Prairie Grove, AR (US); John Coleman, Lowell, AR (US)

(73) Assignee: Duke Technologies, LLC, Fayetteville, AR (US)

( * ) Notice: Subject to any disclaimer, the term of this patent is extended or adjusted under 35 U.S.C. 154(b) by 0 days.

(21) Appl. No.: 19/032,711

(22) Filed: Jan. 21, 2025

(65) Prior Publication Data
US 2025/0171697 A1 May 29, 2025

Related U.S. Application Data

(60) Continuation-in-part of application No. 18/743,351, filed on Jun. 14, 2024, now Pat. No. 12,203,037, which is a continuation of application No. 18/064,845, filed on Dec. 12, 2022, now Pat. No. 12,098,334, which is a continuation of application No. 17/806,127, filed on Jun. 9, 2022, now Pat. No. 11,525,096, which is a continuation-in-part of application No. 17/647,288, filed on Jan. 6, 2022, now Pat. No. 11,414,609, which is a division of application No. 17/362,616, filed on Jun. 29, 2021, now Pat. No. 11,254,883.

(60) Provisional application No. 63/046,149, filed on Jun. 30, 2020.

(51) Int. Cl.
C10G 3/00 (2006.01)
B01D 17/02 (2006.01)
B01D 19/00 (2006.01)
C10G 69/02 (2006.01)

(52) U.S. Cl.
CPC ......... C10G 69/02 (2013.01); B01D 17/0214 (2013.01); B01D 19/0005 (2013.01); C10G 3/40 (2013.01); C10G 2300/1003 (2013.01); C10G 2300/1011 (2013.01); C10G 2300/202 (2013.01); C10G 2300/205 (2013.01); C10G 2300/302 (2013.01); C10G 2300/308 (2013.01); C10G 2300/4006 (2013.01); C10G 2300/4018 (2013.01); C10G 2400/04 (2013.01)

(58) Field of Classification Search
CPC ...... C10G 3/40; C10G 3/50; C10G 2300/202; C10G 2300/205; C10G 2300/302; C10G 2300/308; C10G 2400/02; C10G 2400/04
See application file for complete search history.

(56) References Cited

U.S. PATENT DOCUMENTS

| | | |
|---|---|---|
| 8,280,795 B2 | 10/2012 | Rhodes, III |
| 9,096,804 B2 | 8/2015 | Ackerson et al. |
| 9,159,105 B2 | 10/2015 | Keith et al. |
| 9,828,552 B1 | 11/2017 | Ackerson et al. |
| 10,487,268 B2 | 11/2019 | Ackerson et al. |
| 10,557,338 B2 | 2/2020 | Rhodes et al. |
| 10,961,463 B2 | 3/2021 | Ackerson et al. |
| 10,981,142 B2 | 4/2021 | Ackerson et al. |
| 11,525,096 B2 | 12/2022 | Ackerson et al. |
| 2007/0135669 A1 | 6/2007 | Koivusalmi et al. |
| 2011/0100359 A1* | 5/2011 | North ............ C08H 8/00 127/1 |
| 2011/0197496 A1* | 8/2011 | O'Connor ........ C10G 1/08 44/307 |
| 2011/0226603 A1 | 9/2011 | Peus |
| 2013/0144091 A1 | 6/2013 | Pensare et al. |
| 2014/0109465 A1 | 4/2014 | Coppola et al. |
| 2015/0041305 A1 | 2/2015 | Overheul et al. |
| 2015/0126787 A1 | 5/2015 | Gruber et al. |
| 2018/0346823 A1 | 12/2018 | Urade et al. |
| 2019/0338205 A1 | 11/2019 | Ackerson et al. |
| 2020/0087577 A1* | 3/2020 | Ackerson ........ C10G 3/50 |

FOREIGN PATENT DOCUMENTS

| | | |
|---|---|---|
| CN | 104745310 A | 7/2015 |
| CN | 104962397 A | 10/2015 |
| JP | 5968099 B2 | 8/2016 |
| WO | WO2014131087 A1 | 9/2014 |
| WO | WO2018075017 A1 | 4/2018 |
| WO | WO2019229037 A1 | 12/2019 |
| WO | WO2019229072 A1 | 12/2019 |
| WO | WO2020007790 A1 | 1/2020 |
| WO | WO2020016415 A1 | 1/2020 |
| WO | WO2020252290 A1 | 12/2020 |

OTHER PUBLICATIONS

California Air Resources Board, Low Carbon Fuel Fuel Standard, accessed Jun. 8, 2021, pp. 1-35.
California Air Resources Board, Low Carbon Fuel Standard (LCFS) Guidance 20-04, Apr. 2020, pp. 1-5.
International Search Report (ISR) and Written Opinion of the International Searching Authority (WO/ISA) dated Dec. 6, 2021 in counterpart International PCT Application No. PCT/US2021/039767.
Extended European Search Report dated Jan. 15, 2024 in related European Patent Application No. EP21833930.7.
(Continued)

Primary Examiner — Randy Boyer
(74) Attorney, Agent, or Firm — Grady K. Bergen; Griggs Bergen LLP

(57) ABSTRACT

A method of treating non-petroleum or renewable feedstock containing lignins is carried out by introducing a lignin-containing feedstock into a reactor at a flow velocity of from 20 ft/sec to 100 ft/sec. The feedstock is heated within the reactor to a temperature of from 700° F. to 1100° F. to convert the lignin-containing feedstock into a reactor product. The reactor product is cooled to form a cooled reactor product. At least one of gases, metals, and water are separated and removed from the cooled reactor product to form a final product. The final product has a lignin content that is reduced by 10% to 100% by weight of the initial lignin incorporated into the feedstock.

20 Claims, 4 Drawing Sheets

(56) References Cited

OTHER PUBLICATIONS

Emani et al., Effect of operating conditions on crude oil fouling through CFD simulations, Int'l J. Heat Technol., 35 (4): 1034-1044 (Dec. 2017).
Office Action in counterpart Brazilian Patent Application No. BR 11 2022 027128 0, dated Mar. 26, 2025, pp. 1-6, along with English translation.
Office Action dated Jun. 20, 2025 in related U.S. Appl. No. 19/032,711 and Notice of References Cited, pp. 1-7.

* cited by examiner

SUSTAINABLE DIESEL PRODUCTION FROM LIGNINS

CROSS-REFERENCE TO RELATED APPLICATIONS

This application is a continuation-in-part of U.S. patent application Ser. No. 18/064,845, filed Dec. 12, 2022, now U.S. Pat. No. 12,203,037, which is a continuation of U.S. patent application Ser. No. 17/806,127, filed Jun. 9, 2022, now U.S. Pat. No. 11,525,096, which is a continuation-in-part of U.S. patent application Ser. No. 17/647,288, filed Jan. 6, 2022, now U.S. Pat. No. 11,414,609, which is a division of U.S. patent application Ser. No. 17/362,616, filed Jun. 29, 2021, now U.S. Pat. No. 11,254,883, which claims the benefit of U.S. Provisional Patent Application No. 63/046,149, filed Jun. 30, 2020, each of which is hereby incorporated by reference in its entirety for all purposes.

BACKGROUND

Renewable diesel feedstocks, such as distillers corn oil, fancy bleachable tallow, used cooking oil, etc., which have not been pretreated, contain many components that are detrimental to hydroprocessing reactors or units for producing renewable diesel, as well as other products. These components cause serious plugging problems within the reactors used for forming renewable diesel. As a result, nearly all feedstocks must be pretreated prior to processing into renewable diesel.

Conventional pretreatment processes for renewable diesel feedstocks typically require two stages of pretreatment. The first stage utilizes centrifuges to remove gums and resins by adding water and then centrifuging out the "hydratable" gums. This is followed by an acid wash and centrifugation to remove the "non-hydratable" gums. In the second stage, "bleaching" is used to remove metals and color bodies by "filtering" through an adsorbent. The "spent" adsorbent must be regenerated or disposed in a land fill. In addition to the solid waste material that must be disposed, the process is both labor and capital intensive. Additionally, such pretreatment processes do not address the high oxygen content typically present in the feedstock.

Once the renewable diesel feedstocks are pretreated, the pretreated feedstock is hydrotreated in a renewable diesel unit. Renewable diesel units are typically built for severe operation, operating at high pressures (e.g., 900 psi or more) with a high heat release. This increases the construction costs of the renewable diesel plant, as plants configured for higher operating pressures cost more than those that operate at lower pressures. Conventional renewable diesel units also have a high hydrogen demand. This is due to the high oxygen content (e.g., 10% or more) of conventional renewable diesel feedstocks. The hydrogen reacts with the oxygen of the renewable diesel feedstocks to form water. Water can be especially harmful to the hydroprocessing catalyst of the renewable diesel unit. Water can deactivate the catalyst as well as reduce hydrogen solubility, significantly reducing the overall productivity of the unit.

Additionally, even with hydrotreating, a large amount of waxes or n-paraffins are contained in the hydrotreated product resulting in the hydrotreated product having a very high pour point (e.g., a pour point of 70° F.). A high pour point may make the renewable diesel unsuitable for use in colder climates. The hydrotreated product is therefore typically isomerized to reduce the amount of n-paraffins to form iso-paraffins to lower the pour point of the renewable diesel product to the desired level.

In recent years, much emphasis has been placed on the greenhouse gases produced by burning particular fuels. This not only includes the amount of greenhouse gases that are produced by merely burning the fuels themselves, but also in the amount of greenhouse gases (GHG) that are produced in the fuel's production and supply. This evaluation is often referred to as life-cycle assessment (LCA), which is the methodology for assessing the environmental impacts of commercial products or processes. Standards, such as the U.S EPA's revised National Renewable Fuel Standard (RFS2) and California's Low Carbon Fuel Standard (LCFS) have been implemented in an effort to lowering GHG emissions. These standards are expressed in terms of the carbon dioxide emission intensity or carbon intensity (CI) score or value of a particular fuel. The CI is measured in units of grams of $CO_2$ emissions ($CO_2e$) per megajoule of fuel (i.e., $gCO_2e/MJ$ or g/MJ). As an example, conventional petroleum diesel may have a CI of 100 g/MJ or more. In contrast, renewable diesel may have a CI of around 20 g/MJ. While the CI value of conventional renewable diesel is much lower than for petroleum diesel, lowering the CI value even further is beneficial. Lowering the CI value of renewable diesel not only lowers the GHG emissions associated with the fuel, but a higher monetary value may also be placed on those fuels with lower CI scores, making their production more profitable.

In the context of renewable fuels, tank bottoms refer to the heavy residues or sediments that accumulate at the bottom of storage tanks containing renewable feedstocks for fuels like biodiesel, renewable diesel, ethanol, sustainable aviation fuel, and other biofuels. These tank bottoms often contain significant amounts of gums and resins, which pose challenges during processing. Consequently, tank bottoms are generally regarded as waste materials, adding to disposal challenges and inefficiencies in the production cycle. Further, as discussed earlier, gums and resins are typically removed from renewable feedstocks before hydrotreating, as they can plug or clog reactors and disrupt the refining process. These removed gums and resins from such pretreatments may also constitute waste materials that must be disposed of.

Utilizing such tank bottoms, gums, and resins removed during pretreatment processes, or non-petroleum or renewable feedstocks containing high quantities of gums and resins that can be converted to usable biofuels without their removal would further enhance the sustainability of renewable fuel production by reducing waste and maximizing resource utilization. This approach could also lower disposal costs associated with tank bottom residues, decrease environmental impact by preventing the need for landfill or incineration, and improve overall efficiency by recovering valuable energy content from byproducts that would otherwise be discarded. Additionally, it could expand the range of feedstocks available for biofuel production.

Another underutilized biomaterial often considered a waste material is lignin. Wood is composed primarily of cellulose, hemicellulose, and lignin, with lignin accounting for about 20% to 30% of the wood's mass, while the remainder consists mostly of cellulose and hemicellulose. During the paper manufacturing process, wood is pulped to separate these components, with cellulose and hemicellulose used to produce paper. In contrast, lignin is typically treated as a waste byproduct. Due to limited commercial applications for lignin, it is commonly burned for energy or discarded. Given the massive scale of lignin waste generated from paper production, however, developing processes to convert this underutilized resource into biofuels presents a significant opportunity. Additionally, processes that can utilize materials that contain lignin, such as wood and plant materials, which would otherwise be difficult to process without the removal of lignin, would also be beneficial.

Accordingly, improvements in treating a variety of different renewable feedstocks and in producing renewable fuels are needed to overcome the current shortcomings encountered with respect to these materials and their processing.

BRIEF DESCRIPTION OF THE FIGURES

For a more complete understanding of particular embodiments of the invention, and the advantages thereof, reference is now made to the following descriptions taken in conjunction with the accompanying figures, in which.

DETAILED DESCRIPTION

Figure 1:
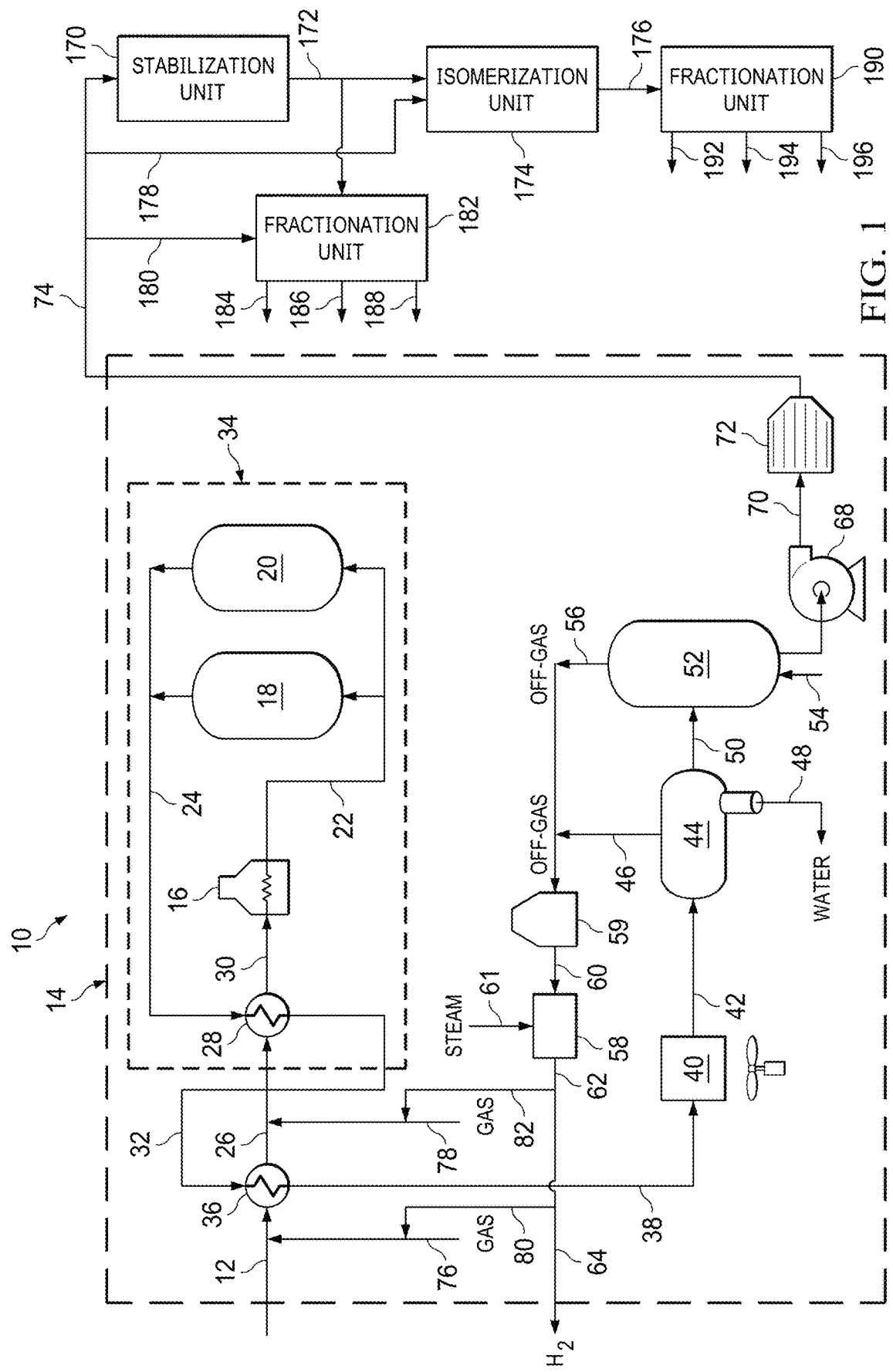
FIG. 1 is a schematic flow diagram of a treatment system for treating a feedstock of animal-derived and/or plant-derived materials.

In the present invention, a treatment process for treating a feedstock of non-petroleum or renewable feedstocks derived from biological sources containing oxygen and contaminants of one or more of metals, gums, and resins is used to produce higher value products, such as renewable diesel fuel or sustainable aviation or jet fuel (SAF). The feedstocks are typically animal-derived and/or plant-derived fats and oils. Such fats and oils are primarily composed of triglycerides, along with minor amounts of mono- and diglycerides, free fatty acids, phosphatides, sterols, tocopherols and tocotrienols, and fatty alcohols. These fats and oils can be used for renewable diesel feedstocks as well as feedstocks for other products, such as sustainable aviation or jet fuel. Sources of such feedstocks may include, but are not limited to, distillers corn oil, fancy bleachable tallow, used cooking oil, animal fat, plant-derived oils, etc. Non-petroleum and renewable feedstocks may also include biomaterials typically regarded as waste, such as tank bottoms, separated gums and resins from the pretreatment of renewable materials, and materials containing lignin, such as wood and plant materials, or lignin produced as a byproduct in the wood and paper industries. The feedstocks may also include pyrolysis oils, such as those derived from cellulosic materials, which typically have a very high oxygen content, as well as other oils having a high metal and/or oxygen content.

In certain embodiments, the non-petroleum or renewable feedstocks may have at least one or more of triglycerides, monoglycerides, diglycerides, free fatty acids, phosphatides, sterols, tocopherols and tocotrienols, and fatty alcohols in an amount of 50 wt %, 55 wt %, 60 wt %, 65 wt %, 70 wt %, 80 wt %, 85 wt %, 90 wt %, and 95 wt % or more by total weight of the feedstock. These are all oxygen-containing compounds that may be found in animal-derived and/or plant-derived fats and oils. Most of the feedstock will be triglycerides, which may be as high as 95 wt % or more by total weight of the feedstock. In certain embodiments, the total triglycerides, monoglycerides, diglycerides, free fatty acids, phosphatides, sterols, tocopherols and tocotrienols, and fatty alcohols may be present in the feedstock from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 92 wt %, 93 wt %, 94 wt %, 95 wt %, 96 wt %, 97 wt %, 98 wt %, and 99 wt % by total weight of the feedstock.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventors appreciate and understand that any and all points within the range are to be considered to have been specified, and that inventors possess the entire range and all points within the range.

Compared to petroleum, these non-petroleum or renewable feedstocks typically have a high oxygen content. In many instances, the oxygen content of the feedstock can be from 8 wt % or more by total weight of the feedstock. In certain embodiments, the oxygen content may be present in the feedstock in an amount from at least, equal to, and/or between any two of 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, and 40 wt %, 41 wt %, 42 wt %, 43 wt %, 44 wt %, 45 wt %, 46 wt %, 47 wt %, 48 wt %, 49 wt %, and 50 wt % by total weight of the feedstock. As discussed earlier, during hydroprocessing or hydrotreating, the oxygen of the feedstocks reacts with hydrogen to form water. This water can be detrimental to the renewable diesel or hydroprocessing reactors and catalysts, as well as reduce hydrogen solubility.

The non-petroleum or renewable feedstocks may also contain undesirable materials or "contaminants," such as metals, gums and resins, which may cause serious plugging or other problems within the reactors or processing equipment. These materials may be naturally occurring in the initially formed fats and oils or may be formed or added during their later use or processing and prior to their use as a renewable feedstock.

The metals may include, but are not limited to, phosphorus (P), sodium (Na), potassium (K), copper (Cu), iron (Fe), calcium (Ca) and magnesium (Mg), lead (Pb), cadmium (Cd), nickel (Ni), vanadium (V), manganese (Mn), zinc (Zn), etc. Such metals may be present in the feedstock in an amount of from a few parts (e.g., 0.1 ppm) per million by weight (ppm) of feedstock to several thousand ppm (e.g., 5,000 ppm or more) by total weight of feedstock. In certain embodiments, the total metal contaminants may be present in the feedstock in an amount from at least, equal to, and/or between any two of 0.1 ppm, 0.5 ppm, 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1200 ppm, 1250 ppm, 1300 ppm, 1350 ppm, 1400 ppm, 1450 ppm, 1500 ppm, 1550 ppm, 1600 ppm, 1650 ppm, 1700 ppm, 1750 ppm, 1800 ppm, 1850 ppm, 1900 ppm, 1950 ppm, 2000 ppm, 2050 ppm, 2100 ppm, 2150 ppm, 2200 ppm, 2200 ppm, 2250 ppm, 2300 ppm, 2350 ppm, 2400 ppm, 2450 ppm, 2500 ppm, 2550 ppm, 2600 ppm, 2650 ppm, 2700 ppm, 2750 ppm, 2800 ppm, 2850 ppm, 2900 ppm, 2950 ppm, 3000 ppm, 3050 ppm, 3100 ppm, 3150 ppm, 3200 ppm, 3200 ppm, 3250 ppm, 3300 ppm, 3350 ppm, 3400 ppm, 3450 ppm, 3500 ppm, 3550 ppm, 3600 ppm, 3650 ppm, 3700 ppm, 3750 ppm, 3800 ppm, 3850 ppm, 3900 ppm, 3950 ppm, 4000 ppm 4050 ppm, 4100 ppm, 4150 ppm, 4200 ppm, 4200 ppm, 4250 ppm, 4300 ppm, 4350 ppm, 4400 ppm, 4450 ppm, 4500 ppm, 4550 ppm, 4600 ppm, 4650 ppm, 4700 ppm, 4750 ppm, 4800 ppm, 4850 ppm, 4900 ppm, 4950 ppm, and 5000 ppm by total weight of the feedstock.

Gums and resins, as well as carbohydrates and proteins, may make up a few percent by weight of many non-petroleum and renewable feedstocks (e.g., gums and/or resins from 1 wt % to 10 wt %). These undesirable components can cause serious plugging and other detrimental problems within the reactors and processing equipment if not removed or converted prior to processing. In certain embodiments, the total gums and/or resins may be present in the feedstock in an amount from at least, equal to, and/or between any two of 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, 10.0 wt % by total weight of the feedstock.

In some instances, the amount of gums and/or resins of the feedstock, such as feedstocks composed of waste materials, such as renewable tank bottoms or gums and resins removed during pretreatment, the gum and/or resin content can be even higher. In such feedstocks, the total gum and/or resin content may be from 10 wt % or more by weight of the feedstock, with from 10 wt % to 30 wt % being typical. In such instances where the gum and/or resin content is higher, the total gums and/or resins may be present in the feedstock in an amount from at least, equal to, and/or between any two of 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt % by total weight of the feedstock.

Feedstocks containing lignin may also be treated in the treatment process. Lignins are complex organic polymers that are typically the leftover waste materials in paper production when the cellulose and hemicellulose are separated from wood pulp for use in paper. Lignins are composed primarily of phenolic or aromatic monomers that are cross-linked or formed into irregular polymers. In certain applications, the lignins may be kraft lignins that are extracted or derived from the kraft pulping process. The lignin may be that from wood materials, such as pine, spruce, fir, oak, maple, birch, etc. The lignin may also be that from other plant materials, such as corn stover, wheat straw, sugarcane bagasse, bamboo, flax, hemp, jute, etc. In some instances, the lignin component used in the feedstock may contain some or minor amounts of cellulose and hemicellulose that has not been separated from the lignin.

The lignin of the lignin-containing feedstocks may be lignin produced as a byproduct from lignin-containing materials, such as those with all or portions of the cellulose and/or hemicellulose removed, such as lignin waste leftover from paper production, or may be the lignin-containing materials themselves that still have all or a portion of the cellulose and/or hemicellulose remaining. Thus, the lignin-containing feedstocks may include the wood or plant material itself that still contains the lignin, along with cellulose and/or hemicellulose.

The lignin materials are typically solid at room temperature so the lignin materials may need to be dispersed or slurried in a liquid carrier. Other liquid non-petroleum or renewable feedstocks may be used as a carrier fluid for lignins. This may include those liquid feedstocks containing high levels of gums and/or resins, such as the tank bottoms previously discussed. Petroleum feedstocks may also be used as a liquid carrier for lignins in certain applications. The lignins may experience some degradation or decomposition when added to the liquid feedstocks. The amount of degradation or decomposition is typically very small, however. The amount of carrier liquid used with the lignin should be sufficient to provide a pumpable slurry of the lignin-containing feedstock at a given temperature.

The initial amount of lignin component (i.e., before any degradation or decomposition once it is added to the liquid carrier) incorporated into the feedstocks may be from 1 wt % or more by total weight of the feedstock, with lignin in amount from 1 wt % to 80 wt % by total weight of the feedstock being typical. The initial amount of lignin component incorporated into the feedstock may be in an amount from at least, equal to, and/or between any two of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, and 80 wt % by total weight of the feedstock.

Referring to FIG. 1, a system 10 for forming products from a fresh or initial non-petroleum or renewable feedstock 12, such as those previously described is shown. This may be animal-derived and/or plant-derived fats and/or oils, as well as other biomaterials, such as renewable tank bottoms and lignins, containing oxygen and contaminants of one or more of metals, gums, resins. The system 10 includes a treatment system 14 for converting or removing oxygen and other materials, including metals, gums, and resins in the feedstock 12. This may occur before any hydroprocessing or hydrotreating, such as in a renewable diesel unit.

The feedstock 12 is ultimately heated to a temperature of from 700° F. to 1100° F. in an externally heated reactor 16. The reactor 16 is catalyst-free or does not contain or utilize a hydroprocessing catalyst. The reactor 16 may be a tubular or plug flow reactor. In certain embodiments, a useful operating or treatment temperature range for the reactor 16 may be from at least, equal to, and/or between any two of 700° F., 705° F., 710° F., 715° F., 720° F., 725° F., 730° F., 735° F., 740° F., 745° F., 750° F., 755° F., 760° F., 765° F., 770° F., 775° F., 780° F., 785° F., 790° F., 795° F., 800° F., 805° F., 810° F., 815° F., 820° F., 825° F., 830° F., 835° F., 840° F., 845° F., 850° F., 855° F., 860° F., 865° F., 870° F., 875° F., 880° F., 885° F., 890° F., 895° F., 900° F., 905° F., 910° F., 915° F., 920° F., 925° F., 930° F., 935° F., 940° F., 945° F., 950° F., 955° F., 960° F., 965° F., 970° F., 975° F., 980° F., 985° F., 990° F., 995° F., 1000° F., 1005° F., 1010° F., 1015° F., 1020° F., 1025° F., 1030° F., 1035° F., 1040° F., 1045° F., 1050° F., 1055° F., 1060° F., 1065° F., 1070° F., 1075° F., 1080° F., 1085° F., 1090° F., 1095° F., and 1100° F. In the discussion that follows, a temperature of 950° F. for the heating of the feedstock within the reactor 16 may be used for illustrative purposes. The reactor 16 can be a fired heater, electrically heated, steam heated, hot gases, oil heated, etc. The heating can also be that provided as waste heat from other processes.

In some embodiments, one or more optional secondary reactors 18, 20 may be provided with the treatment system 14 that are located downstream and receive the reactor discharge stream 22 from reactor 16, which may be considered a primary reactor. The reactors 18, 20 may also be catalyst free or do not contain or utilize a hydroprocessing catalyst. These secondary reactors 18, 20 may be in configured in parallel or series and may be heated or fired reactors, as well, for continued heating of the discharge stream 22 to maintain the elevated reaction temperatures. In other embodiments, the reactors 18, 20 are non-heated, with the reactors 18, 20 merely serving as vessels for increased residence time before cooling, where the reactions can continue to occur from the heated discharge stream 22 from reactor 16. The reactors 16, 18, 20 and their inlets are configured in combination with the fluid flow of the feeds to provide tubular or plug flow through the reactors to eliminate or reduce backflow and back mixing. The primary reactor 16 and secondary reactors 18, 20 may be sized and configured to provide a selected residence time for the introduced feedstock at the selected reactor temperature to ensure that the feedstock is sufficiently reacted before being discharged from the reactors. The residence time within the reactor section of the system 14 is typically on the order of only a few seconds (e.g., 5 seconds or less).

Pressures within the reactors 16, 18, 20 will typically range from 0 psig to 1000 psig. In particular applications, the operating pressure of the reactor(s) may be from at least, equal to, and/or between any two of 0 psig, 10 psig, 20 psig, 30 psig, 40 psig, 50 psig, 60 psig, 80 psig, 90 psig, 100 psig, 110 psig, 120 psig, 130 psig, 140 psig, 150 psig, 160 psig, 170 psig, 180 psig, 190 psig, 200 psig, 210 psig, 230 psig, 240 psig, 250 psig, 260 psig, 270 psig, 280 psig, 290 psig, 300 psig, 310 psig, 320 psig, 330 psig, 340 psig, 350 psig, 360 psig, 370 psig, 380 psig, 390 psig, 400 psig, 410 psig, 420 psig, 430 psig, 440 psig, 450 psig, 460 psig, 470 psig, 480 psig, 490 psig, 500 psig, 510 psig, 520 psig, 530 psig, 540 psig, 550 psig, 560 psig, 570 psig, 580 psig, 590 psig, 600 psig, 610 psig, 620 psig, 630 psig, 640 psig, 650 psig, 660 psig, 670 psig, 680 psig, 690 psig, 700 psig, 710 psig, 720 psig, 730 psig, 740 psig, 750 psig, 760 psig, 770 psig, 780 psig, 790 psig, 800 psig, 810 psig, 820 psig, 830 psig, 840 psig, 850 psig, 860 psig, 870 psig, 880 psig, 890 psig, 900 psig, 910 psig, 920 psig, 930 psig, 940 psig, 950 psig, 960 psig, 970 psig, 980 psig, 990 psig, and 1000 psig.

Reactions within the reactor 16 and reactors 18, 20 occur very fast at the above temperatures, without significant yield loss. All or a majority of the gums, resins, and/or lignins react in a thermal cracking reaction within the reactor 16 to form smaller, lower molecular weight components, such as non-condensable gases, naphtha, sustainable aviation fuel, and renewable diesel compounds, which can removed as off-gases or passed through a renewable diesel hydrotreater or other hydroprocessing equipment to make useful products without causing fouling problems. In particular embodiments, the gum and resin content of the initial feedstock can be reduced to from 10% to 100% by weight of the initial gum and resin content of the feedstock 12. In certain embodiments, the gum and resin content of the feedstock 12 can be reduced by an amount of at least, equal to, and/or between any two of 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% by weight of the initial gum and resin content.

In addition, oxygen-containing compounds in the feedstock (e.g., triglycerides, mono- and diglycerides, free fatty acids, etc.) can also react to form water, $CO_2$, CO, and other small, oxygenated compounds. Oxygen present in the feedstock delivered to a renewable diesel unit or other hydroprocessing unit will react with hydrogen to form water. The removal of oxygen in the treatment system 14 prior to such hydroprocessing therefore lowers the hydrogen requirement in the renewable diesel unit or other processing unit downstream. From 10% to 100% of oxygen in the initial feedstock can be removed in the treatment. As an example, at a reaction temperature of 950° F., from 40% to 60% of oxygen can be removed from the feedstock very rapidly. All of the oxygen can be removed at higher temperatures and/or longer reaction times. The triglycerides and mono- and diglycerides of the feedstock 12 also react or "break apart" to form free fatty acids, paraffins, olefins, and other various compounds.

The high-temperature reactor product 24 from the primary tubular reactor 16, and any secondary reactors 18, 20, is cooled to form a cooled reactor product. In certain applications, heat from the high-temperature reactor product 24 is recovered and may be used in heating the feed 26 in a first stage cross-heat exchanger. In the first stage of cross-heat exchange, the feed 26 is used to cool the hot reactor product 24 from reactor 16 and any reactors 18, 20 in heat exchanger 28. The temperature of the hot reactor product 24 will typically be from 750° F. to 1100° F. and will typically be at a temperature that is from 50° F. to 500° F. above that of the feed 26. This typically results in the feed 26 introduced into reactor 16 being heated (ΔT) from 25° F. to 500° F. and the heated product 24 being cooled or dropped in temperature (ΔT) from 25° F. to 500° F. The feed 26 may initially be at a temperature of from 200° F. to 600° F. prior to entering the heat exchanger 28. The heated feedstock 30 discharged from exchanger 28 and introduced into the reactor 16 is typically at a temperature of from 700° F. to 1000° F.

Moreover, the reduced-temperature reactor product 32 discharged from the heat exchanger 28 may be at a temperature of from 250° F. to 1000° F. As an example, where the hot reactor product 24 is at 950° F. and the feed 26 is at 650° F., the feed 26 may be heated to approximately 900° F. to form heated feed 30 and the product 24 cooled to a temperature of about 700° F. to form reduced-temperature reactor product 32. In certain embodiments, the reactor product 24 may be cooled to a temperature of at least, equal to, and/or between any two of 250° F., 255° F., 260° F., 265° F., 270° F., 275° F., 280° F., 285° F., 290° F., 295° F., 300° F., 305° F., 310° F., 315° F., 320° F., 325° F., 330° F., 335° F., 340° F., 345° F., 350° F., 355° F., 360° F., 365° F., 370° F., 375° F., 380° F., 385° F., 390° F., 395° F., 400° F., 405° F., 410° F., 415° F., 420° F., 425° F., 430° F., 435° F., 440° F., 445° F., 450° F., 455° F., 460° F., 465° F., 470° F., 475° F., 480° F., 485° F., 490° F., 495° F., 500° F., 505° F., 510° F., 515° F., 520° F., 525° F., 530° F., 535° F., 540° F., 545° F., 550° F., 555° F., 560° F., 565° F., 570° F., 575° F., 580° F., 585° F., 590° F., 595° F., 600° F., 610° F., 615° F., 620° F., 625° F., 630° F., 635° F., 640° F., 645° F., 650° F., 655° F., 660° F., 665° F., 670° F., 675° F., 680° F., 685° F., 690° F., 695° F., 700° F., 750° F., 755° F., 760° F., 765° F., 770° F., 775° F., 780° F., 785° F., 790° F., 795° F., 800° F., 805° F., 810° F., 815° F., 820° F., 825° F., 830° F., 835° F., 840° F., 845° F., 850° F., 855° F., 860° F., 865° F., 870° F., 875° F., 880° F., 885° F., 890° F., 895° F., 900° F., 905° F., 910° F., 915° F., 920° F., 925° F., 930° F., 935° F., 940° F., 945° F., 950° F., 955° F., 960° F., 965° F., 970° F., 975° F., 980° F., 985° F., 990° F., 995° F., and 1000° F. to form the reduced-temperature reactor product 32.

At temperatures where the heated feed 30 is heated at or above 700° F., reactions of the feed 26 begin in the heat exchanger 28 so that it may be considered part of an overall reactor system 34 for treatment of the feedstock. In other embodiments where the feed 30 is not heated at or above 700° F., only the primary reactor 16 and any secondary reactors 18, 20 may be considered part of the overall reactor system 34.

In certain embodiments, a second cross-heat exchanger 36 may be provided for further cooling the reduced-temperature reactor product 32 from the heat exchanger 28 at a ΔT of from 50° F. to 500° F. The heat exchanger 36 may use all or portion of the fresh feedstock 12 to further cool the product 32 to a temperature of from 75° F. to 200° F. This typically results in the initial or fresh feed 12 being heated (ΔT) from 25° F. to 500° F. The temperature of the initial feedstock 12 may vary but can be from room (e.g., 68° F. to 72° F.) or ambient atmospheric temperature (e.g., 0° F. to 100° F.) to 150° F. in some embodiments, which may be heated in the heat exchanger 36 to a temperature of from 200° F. to 650° F. Where the feedstock 12 contains oils or fats that are solid at room temperature, the fresh feedstock 12 may need to be pre-heated above room or ambient temperature so that the oils and fats are in a flowable liquid form. In the example where the reduced-temperature reactor product 32 is at 700° F., the product 32 is cooled further to provide a cooled reactor product 38 having a temperature of about 200° F., with the initial feed 12 being heated to 650° F. to form the feed 26. At temperatures where the fresh feed 12 is heated at or above 700° F. in heat exchanger 36, reactions of the fresh feed 12 begin in the heat exchanger 36 so that it may be considered part of an overall reactor system 34 for treatment of the feedstock.

In some instances, further cooling of the cooled reactor product 38 may be carried out in a further heat exchanger 40 that does not utilize the feedstock 12 as a cooling fluid. The heat exchanger 40 may be used in lieu of or in addition to the heat exchanger 36. The final cooled reactor product 42 will typically be at a temperature of from 100° F. to 200° F.

The final cooled reactor product 42 is then introduced into one or more separators 44. Off-gases 46, such as $CO_2$, CO, and non-condensed hydrocarbon gases that are produced in the reactor system 34 are separated from the cooled reactor product 42. The non-condensable hydrocarbon gases may be $C_1$ or greater, but are typically light hydrocarbons of $C_1$ to $C_5$ or $C_6$ hydrocarbons. As used herein, "non-condensable gases" are those substances that remain in the gaseous phase under the given process conditions. In one example, at a reaction temperature of 950° F., the non-condensable gases may be from 75% to 80% $CO_2$ and some CO, from 1% to 2% methane, from 6% to 8% ethane, from 4% to 6% propane, from 4% to 5% butane, and from 4% to 5% pentane. Carbon dioxide and CO produced in the reaction may reduce the final liquid hydrocarbon product yield. The oxygen lost to these compounds, however, results in lower hydrogen consumption if the product is further hydroprocessed, because it is no longer available to react with the hydrogen to end up as water.

Liquid water 48 is also separated from the liquid hydrocarbon or oil phase of reactor product 42. Metals that have been stripped from the reactor walls of reactor 16 and reactors 18, 20 that are carried in the cooled reactor product 42 are predominantly distributed in the water phase 48 and thus most of the metals are removed with the water 48. Some metals may also be present with the coke formed in the reactors that is carried in the reactor product. The remaining liquid hydrocarbons 50 from separator 44 may then be introduced into a further stripping unit 52 where stripping gases 54 are used to remove additional light off-gases 56 that are separated from the liquid hydrocarbons 66. The non-condensable or off-gas composition and quantity are dependent on reaction temperature. Also, the amount of off-gas depends on the temperature and pressure of the separator. Higher pressure and lower temperatures in the separators 44, 52 results in less off-gas due to the gases remaining in the liquid. The non-condensable hydrocarbon gases of stream 56 may be $C_1$ or greater, but are typically light hydrocarbons of $C_1$ to $C_5$ or $C_6$ hydrocarbons.

In certain embodiments, all or portions of the off-gases of one or both streams 46, 56 may be fed to a reformer unit 58. Prior to reforming, the off-gases from streams 46, 56 may be purified in one or more gas scrubber or gas purification units 59 to remove undesirable compounds, such as sulfur-containing compounds (e.g., $H_2S$, $SO_2$, etc.), chorine-containing compounds (e.g., HCl, $Cl_2$, etc.), nitrogen-containing compounds (e.g., NOx, amines, $NH_3$, etc.), and other compounds. The removal of such undesirable compounds may prevent the deactivation of the reforming catalyst and further purify the hydrogen gas. The purified off-gases 60 with the undesirable compounds removed are then fed to the reforming unit 58.

Although a single reformer unit 58 and purification unit 59 are shown for processing both streams 46, 56, second or additional reformer and purification units (not shown) may be provided for purifying and reforming of each of the separate streams 46, 56. The reformer unit 58 may be a steam or autothermal reformer unit and may contain a reforming catalyst. The reformer unit 58 is operated under reforming conditions, including the addition of steam 61, to convert the hydrocarbons from off-gas streams 46, 56 to produce hydrogen gas ($H_2$). The product discharge 62 from the reformer unit 58 will typically contain hydrogen gas, CO, $CO_2$, methane and unconverted hydrocarbons. All or a portion of the product discharge 62 from reformer unit 58 may be further processed, such as through a shift conversion unit (not shown) and pressure shift adsorption (PSA) unit (not shown) to increase the hydrogen gas content and/or purify the hydrogen gas product 64, which may be collected and stored or used within the system 10 or other systems.

The separated liquid hydrocarbons 66 are introduced into and pressurized in pump 68. The pressurized liquid hydrocarbons 70 are then filtered in filtering unit 72, such as a cartridge filter or sand filter, to remove coke and any remaining metals and other solids to form the final treated product 74.

At the high reaction temperatures, coke formed during the reaction and metals present in the initial feedstock 12 may tend to be deposited on the walls of the reactor 16 and reactors 18, 20. To keep the reactors 16, 18, 20 from coking and plugging from such materials, a high velocity is maintained in the reactor system 34 through a combination of pipe sizing, to keep the velocity high, and the addition of a high velocity oxygen-gas-free gas (i.e., no $O_2$), such as one or more of steam, nitrogen, $CO_2$, hydrogen, etc., to increase the velocity even more. In most instances, the gas will be steam or nitrogen. In particular embodiments, the gas is added with the feedstock to provide a flow velocity of the feedstock within the reactors 16, 18, 20 or reactor tubes of from 20 ft/sec to 100 ft/sec, more particularly from 30 ft/sec to 70 ft/sec, and still more particularly from 20 ft/sec to 50 ft/sec. The high velocity gas may be added to the feed stream 12 and/or 26, as shown at 76 and 78. If added to the heated feed stream 26, the gas may be heated to a temperature around (e.g., ≤50° F. of the feed temperature) or above the temperature of the feed 26 to prevent a significant drop in temperature of the feed 26. In other embodiments, the high velocity gas 76 and/or 78 is not preheated.

In certain embodiments, all or portions of the reformer product discharge 62, indicated as streams 80, 82 may be combined with or used as the high velocity gas streams 76, 78, respectively, or otherwise combined with the feed streams 12 and/or 26. In certain instances, the streams 80, 82 may be further pressurized and/or heated to provide the necessary high velocities and temperatures.

This high velocity of the heated feed 30 from heat exchanger 28 that is introduced into reactors 16, 18, 20 results in the walls of the reactors being kept clean due to the erosion of any deposited coke and metals from the walls due to the high velocity fluid flow. The coke and metals thus do not adhere to the reactor walls and are removed and carried in the reactor product streams. The coke and metals carried in the reactor product streams are eventually removed in the water phase 48 and/or through filtration unit 72, as discussed previously.

From 50% to 99% or more up to 100% by weight of metals in the fresh or original feedstock can be removed utilizing the disclosed treatment system and method. More particularly, from 90% to 99% or more by weight of metals in the feedstock can be removed utilizing the disclosed process. In certain embodiments, the metal content of the initial feedstock 12 can be reduced by an amount of at least, equal to, and/or between any two of 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% by weight of the initial metal content.

Figure 2:
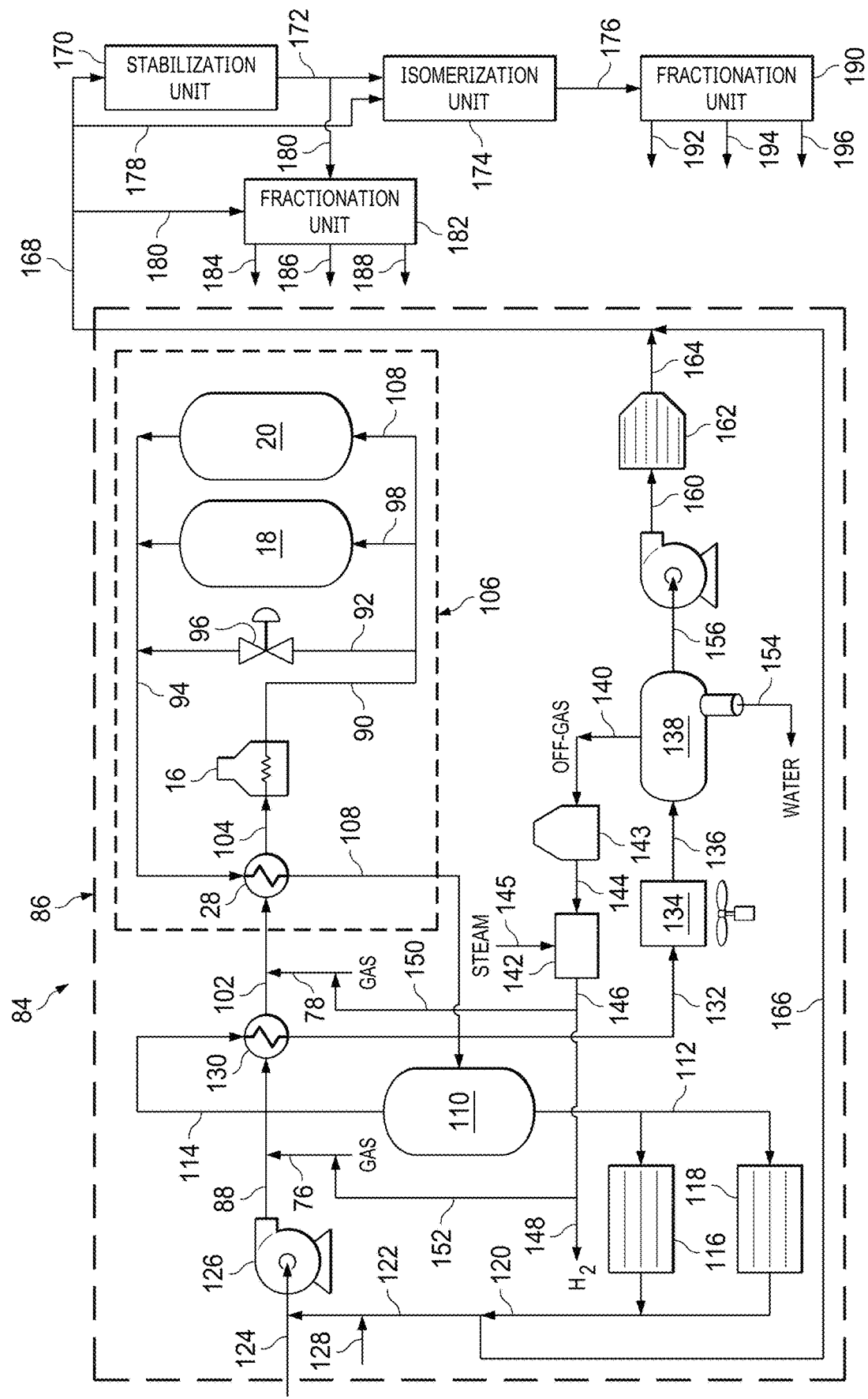
FIG. 2 is a schematic flow diagram of an alternate embodiment of a treatment system for treating a feedstock of animal-derived and/or plant-derived materials that employs a recycle stream.

Referring to FIG. 2, another treatment system 84 for forming products from a fresh or initial non-petroleum or renewable feedstock, which may be the same or similar to the feedstock 12. This may include animal-derived and/or plant-derived materials containing oxygen, and one or more of metals, gums, resins, and lignins. The system 84 is similar to the system 10 of FIG. 1, with similar components labeled with the same reference numerals. The system 84 includes a treatment system 86 for converting or removing oxygen and other materials including metals, gums, resins, lignins in a feedstock 88 before any hydroprocessing or hydrotreating, such as in a renewable diesel unit. The system 84 differs from the system 10 in that it utilizes a recycle stream, which may allow better control of the process, as well as facilitate higher removal of oxygen.

In the treatment system 86, the feedstock 88 is ultimately heated to a temperature of from 750° F. to 1100° F., or similar temperatures to those described previously for the system 10, in the externally heated tubular reactor 16. The reactor pressures may also be the same. The reactor 16 of FIG. 2 is also catalyst free or does not contain or utilize a hydroprocessing catalyst.

One or more secondary reactors 18, 20, which may be the same or similar to those of FIG. 1, may also be provided with the treatment system 86 that are located downstream and receive all or a portion of the reactor discharge stream 90 from reactor 16. In the treatment system 86 of FIG. 2, a bypass line 92 is provided for bypassing the secondary reactors 18, 20 and directing all or a portion of the reactor discharge stream 90 to reactor product stream 94. A control valve 96 allows selective control of flow of the reactor product through bypass line 92 so that the amount of product through line 92 can be varied, wherein only a portion (e.g., from 10% to 90%) of the product discharge 90 is directed through bypass line 92, with the remaining reactor product discharge 90 being directed through lines 98, 100 to reactors 18, 20. In some embodiments, the valve 96 may remain closed during operation so that all of the discharge product stream 22 is directed through lines 98, 100 to the secondary reactors 18, 20, respectively. In other instances, all of the product stream 22 may be directed through bypass line 92, with none being delivered to the reactors 18, 20. Although not shown, a similar bypass line may be used with the system 10 of FIG. 1.

In certain applications, heat from the high-temperature reactor product 94 is also recovered and may be used in heating the feed 102 in a first stage cross-heat exchanger. In the first stage of cross-heat exchange, the feed 102 is used to cool the hot reactor product 94 from reactor 16 and any secondary reactors 18, 20 in heat exchanger 28. The temperature of the hot reactor product 94 will typically be from 750° F. to 1100° F. and will typically be at a temperature that is from 50° F. to 500° F. above that of the feed 102. The heated feedstock 104 discharged from exchanger 28 and introduced into the reactor 16 is typically at a temperature of from 700° F. to 1000° F.

As with the treatment system 14 of FIG. 1, at temperatures where the heated feed 104 is heated at or above 700° F., reactions of the feed 102 begin in the heat exchanger 28 so that it may be considered part of an overall reactor system 106 for treatment of the feedstock. In other embodiments where the feed 102 is not heated at or above 700° F., only the primary reactor 16 and any secondary reactors 18, 20 may be considered part of the overall reactor system 106.

Moreover, the reduced-temperature reactor product 108 discharged from the heat exchanger 28 may be at a temperature of from 350° F. to 700° F., where some, but not all, of the reactor product is condensed. The reduced temperature product 108 is typically at temperatures and conditions where water remains in a vapor or superheated state. The reduced-temperature reactor product 108 is then introduced into a first "hot" separator 110 where condensed liquid hydrocarbons from product stream 108 are separated as hot liquid stream 112 from other gases, such as lower boiling point hydrocarbons, steam, and other gases, such as CO, $CO_2$, etc., which are discharged as "hot" gas stream 114.

The separated liquid stream 112 is passed through one or more filter units 116, 118, which may the same or similar to the filter unit 72 of FIG. 1. The filter units 116, 118 may be configured in series or parallel. The filter units 116, 118 are used to filter out coke and any entrained metals and other solids present in the liquids of stream 112 to form filtered liquid stream 120.

A portion (e.g., from 10% to 90%) of the filtered liquid stream 120, is used to form recycle stream 122. The recycle stream 122 is combined with a fresh or initial non-petroleum or renewable feedstock 124, which may be the same or similar to the feedstock 12, previously described. The combined fresh feedstock 124 and recycle stream 122 are delivered to pumping unit 126 where they form feedstock 88, which is a combined feedstock of fresh feedstock and recycled product. Because the recycle stream 122 is at an elevated temperature, this also facilitates heating of the fresh feedstock 124.

In some embodiments, a separate feedstock 128 from the feedstock 124 may be combined with the recycle stream 122. This may be the same or different from the feedstock 124. For instance, the feedstock 124 may be formed primarily from non-petroleum or renewable fats and/or oils, while the feedstock 128 may be from tank bottoms or a feedstock containing high levels (i.e., ≥10 wt %) of gums and/or resins or may be lignin or a lignin-containing feedstock that is added to the recycle stream 122.

If necessary, the combined feedstock 88 may also be passed through a heat exchanger 130. The heat exchanger 130 may be configured as a cross heat exchanger, where the separated "hot" product gas stream 114 from separator 110 is used to heat the combined feedstock 88 to form feed stream 102. Similarly, the combined feed stream 88, which is at a lower temperature than the product gas stream 114, may be used for further cooling the gas stream 114 to form cooled product stream 132, where some, but not all, reactor products may be condensed.

High velocity gas, such as that described with the system 10 of FIG. 1, may also be added to the feed stream 88 and/or 102, as shown at 76 and 78, to keep the reactors 16, 18, 20 free from coking and plugging from metals that would otherwise be deposited on the reactor walls.

Further cooling of the cooled reactor product 132 may be carried out in a further heat exchanger 134 to form cooled reactor product 136. The final cooled reactor product 136 will typically be at a temperature of from 100° F. to 200° F.

The final cooled reactor product 136 is then introduced into one or more separators 138. Non-condensable off-gases 140, such as $CO_2$, CO and hydrocarbons, which are produced in the reactor system 106 are separated from the cooled reactor product 136. The non-condensable hydrocarbon gases may be $C_1$ or greater, but are typically light hydrocarbons of $C_1$ to $C_5$ or $C_6$ hydrocarbons.

In certain embodiments, all or a portion of the off-gases 140 from separator 138 may be fed to a reformer unit 142. Prior to reforming, the off-gases 140 may be purified in one or more gas scrubber or gas purification units 143 to remove undesirable compounds, such as sulfur-containing compounds (e.g., $H_2S$, $SO_2$, etc.), chorine-containing compounds (e.g., HCl, $Cl_2$, etc.), nitrogen-containing compounds (e.g., NOx, amines, $NH_3$, etc.), and other compounds that may be undesirable or detrimental to the reforming process or catalyst. The purified off-gases 144 with the undesirable compounds removed are then fed to the forming unit 142.

The reformer unit 142 may be a steam or autothermal reformer unit and may contain a reforming catalyst. The reformer unit 142 is operated under reforming conditions, including the addition of steam 145, to convert the hydrocarbons from off-gas stream 140 to form hydrogen gas ($H_2$). The product discharge 146 from the reformer unit 142 will typically contain hydrogen gas, CO, $CO_2$, methane and unconverted hydrocarbons. All or a portion of the product discharge 146 from reformer unit 142 may be further processed, such as through a shift conversion unit (not shown) and pressure shift adsorption (PSA) unit (not shown) to increase the hydrogen gas content and/or purify the hydrogen gas product 148, which may be collected and stored or used in the system 84 or other systems.

In certain embodiments, all or portions of the reformer product discharge 146, indicated as streams 150, 152 may be combined with or used as the high velocity gas streams 76, 78, respectively, or are otherwise combined with the feed streams 88 and/or 102. In certain instances, the streams 150, 152 may be further pressurized and/or heated to provide the necessary high velocities and temperatures.

Liquid water 154 is also separated from the liquid hydrocarbon or oil phase of reactor product 136. Metals that have been stripped from the reactor walls of reactor 16 and reactors 18, 20 that are carried in the cooled reactor product 136 are predominantly distributed in the water phase 154 and thus most of the metals are removed with the water 154. The remaining liquid hydrocarbons 156 are introduced into and pressurized in pump 158. Although not shown, a stripping unit, such as the stripping unit 52 of FIG. 1, may also be used with system 84 to remove additional light gases from the stream 156 before the liquid hydrocarbons are introduced into the pump 158. The pressurized liquid hydrocarbons 160 may then be filtered in filtering unit 162, such as a cartridge filter or sand filter, to remove any coke and remaining metals and other solids in the product stream 160 to form filtered liquid product stream 164.

The portion of the filtered liquid product stream 120 that is not recycled as recycle stream 122 may be combined as liquid product stream 166 with the liquid stream 164 to from the final treated product 168.

The use of the recycle stream 122 in system 84 facilitates further removal of oxygen from the feedstock. For example, where the system 10 is operated under conditions where the oxygen in the feed is reduced by 50%, recycling a portion of the reaction products, such as with recycle stream 122, can result in a further reduction in oxygen under similar reaction conditions. This may result in a 20% to 70% further reduction of the oxygen content of the feedstock, so that the system 84 can remove from 60% to 85% of the oxygen from the feed under the same reaction conditions.

In certain instances, the products 74, 168 from the systems 10, 84 may be used as a feedstock for further processes.

Each of the systems 10, 84 may thus include a further stabilization unit, such as the stabilization unit 170 where the products 74, 168 of FIGS. 1 and 2 are stabilized to form a stabilized product 172. This may include hydroprocessing, where the stabilization unit 170 includes a reactor containing a hydroprocessing catalyst that is contacted by the products 74, 168 in the presence of hydrogen under conditions suitable for hydroprocessing. As used herein, the term "hydroprocessing," unless stated otherwise or is apparent from the context, is meant to include hydrotreating, hydrofinishing, hydrorefining, hydrocracking, hydroisomerization, and hydrodemetalization. The stabilization unit 170 may be used to remove residual oxygen and/or olefins.

In particular embodiments, all or a portion of the stabilized product 172 may be delivered to a separate isomerization unit 174, which may be provided with the systems 10, 84. The isomerization unit 174 will typically contain an isomerization catalyst, such as a noble metal catalyst (e.g., platinum, palladium, etc.), which may be supported (e.g., alumina, zeolite, etc.) or unsupported. The isomerization unit 174 is operated under conditions suitable for isomerizing some or all of n-paraffins to iso-paraffins and/or some or all of aromatics to cycloparaffins or naphthenic compounds to provide an isomerized product 176 with a selected pour point, cloud point, freeze point, or other properties. Alternatively, all or a portion of the products 74, 168 may be introduced directly into the isomerization unit 174 as stream 178 without being hydroprocessed in the stabilization unit 170 to provide an isomerized product 176 with the selected properties.

In some embodiments, all or a portion of the stabilized product 172 as stream 180 that has not been isomerized may be directed to a fractionation unit 182 of each of the systems 10, 84, where the product 180 may be fractionated into various products, such as a naphtha fraction 184, a sustainable aviation fuel fraction 186, and a renewable diesel fraction 188. Similarly, all or a portion of the isomerized product 176 may be sent to a fractionation unit 190 of each of the systems 10, 84, where the isomerized product 176 is fractionated into various products, such as a naphtha fraction 192, a sustainable aviation fuel fraction 194, and a renewable diesel fraction 196.

Figure 3:
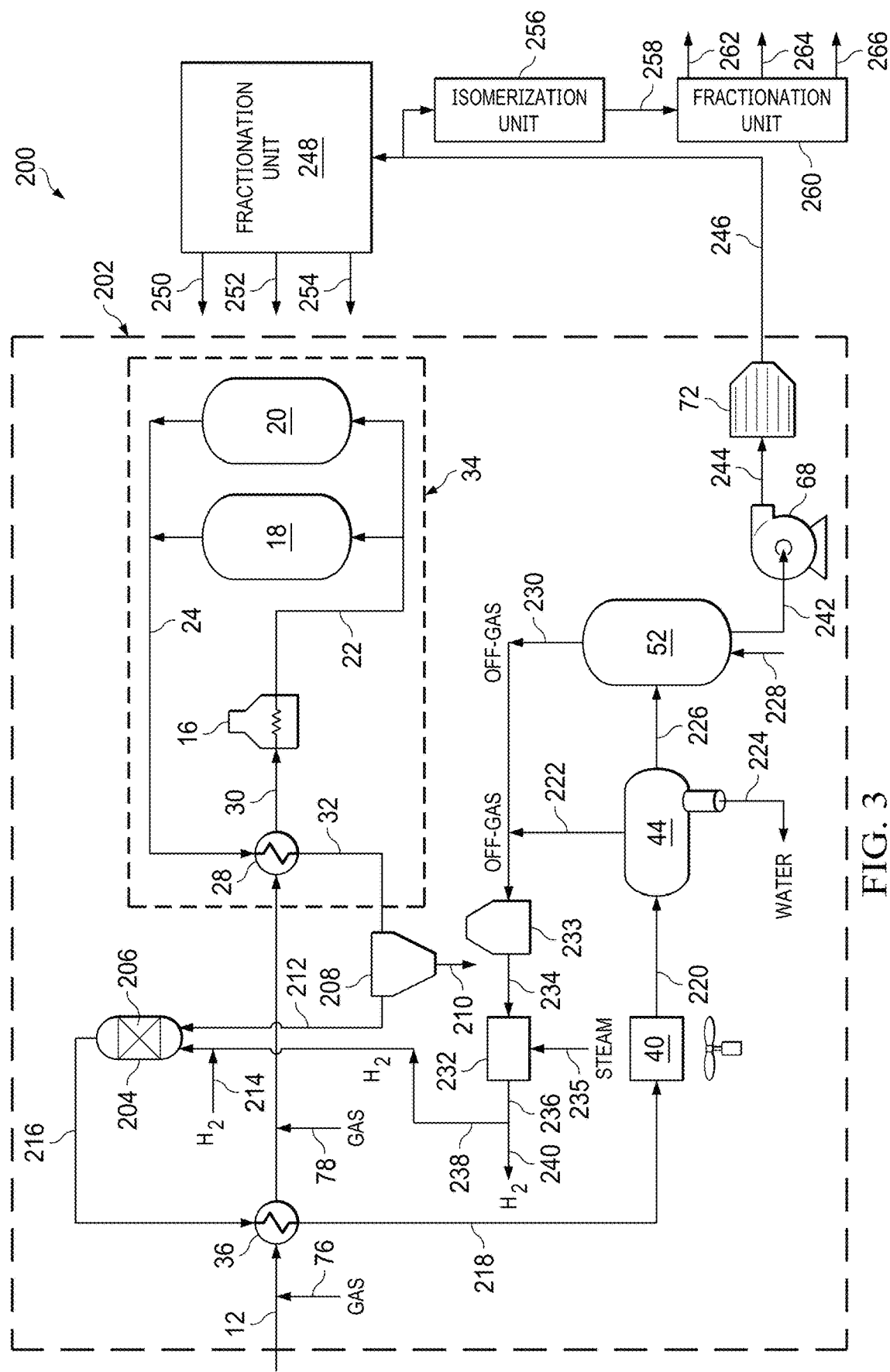
FIG. 3 is a schematic flow diagram of a further embodiment of a treatment system for treating a feedstock of animal-derived and/or plant-derived materials that incorporates a hydroprocessing reactor.

Referring to FIG. 3, another embodiment of a treatment system 200 is shown for forming products from a fresh or initial non-petroleum or renewable feedstock, which may be the same or similar to the feedstock 12. This may include animal-derived and/or plant-derived fats and/or oils containing oxygen and contaminants of one or more of metals, gums, and resins, is shown. The feedstock 12 may also include renewable tank bottoms or other feedstocks containing high amounts (i.e., ≥10 wt %) of gums and/or resins. The feedstock 12 may also be a lignin-containing feedstock. The system 200 is similar to the system 10 of FIG. 1, with similar components labeled with the same reference numerals. The system 200 includes a treatment system 202 for removing oxygen, sulfur, and undesirable materials including metals, gums, and resins from the feedstock 12. Process conditions, such as flow rates, pressures, temperatures, etc. are the same or similar to those of system 10, unless otherwise stated.

The system 200 differs from the system 10 in that it includes a hydroprocessing reactor 204 used within the treatment system 202. The hydroprocessing reactor 204 facilitates the further saturation of olefins and the further reduction of the oxygen and sulfur content of the reduced-temperature reactor product 32 discharged from the heat exchanger 28. It also facilitates the reduction or elimination of undesirable odors that may be given off from the products of reactors 16, 18, 20 without their further treatment. The use of the hydroprocessing reactor 204 within the treatment system 200 may also eliminate the need for a stabilization unit and/or isomerization unit, as used with the embodiments of FIGS. 1 and 2.

Unlike the reactors 16, 18, 20, which contain no hydroprocessing catalyst or are catalyst-free, the reactor 204 is that containing a hydroprocessing catalyst, which may be contained within a catalyst bed 206. The hydroprocessing catalyst used in the reactor 204 may be those commonly used in hydroprocessing reactors to remove oxygen and other heteroatoms, such as sulfur and nitrogen from organic compounds, as well as for the hydrogenation of unsaturated bonds. Such catalysts may be those containing metals of Mo, W, Co, Ni, Pt and Pd and combinations of these and may be supported or unsupported. Non-limiting examples of such hydroprocessing catalysts may include $Mo/Al_2O_3$, $CoMo/Al_2O_3$, $CoMo/SiO_2$, $NiMo/Al_2O_3$, $NiMo/SiO_2$, and $NiW/Al_2O_3$ catalysts.

The hydroprocessing reactor 204 may be configured and operated as a conventional hydroprocessing reactor. In other instances, however, the hydroprocessing reactor 204 may be one that is uniquely configured and operated as those hydroprocessing reactors described in U.S. Pat. Nos. 9,096,804; 9,828,552; 10,260,009; 10,487,268; 10,717,938; 10,961,463; and 10,981,142, each of which is hereby incorporated herein by reference in its entirety for all purposes. Such reactors are configured and operated to accommodate high-contaminant petroleum and non-petroleum feedstocks.

The feed for the hydroprocessing reactor 204 is the reduced-temperature reactor product 32 discharged from the heat exchanger 28, which may be at a temperature of from 250° F. to 1000° F. In certain embodiments, a cyclone or solids separator 208 may be used to remove any entrained solids from the reduced-temperature reactor product stream 32 that are carried over from the reactors 16, 18, 20 as solids stream 210. The remaining separated reactor product 212 is then introduced into the hydroprocessing reactor 204. The hydrogen necessary for the hydroprocessing reaction may be that residual hydrogen contained in product stream 212 from hydrogen gas introduced as or with the high velocity gas streams 76 and/or 78. In other embodiments, a separate hydrogen feed 214 for the hydroprocessing reaction may be introduced directly into the reactor 204 to facilitate the hydroprocessing reaction.

The hydroprocessed product 216 discharged from reactor 204 is then introduced into the second cross-heat exchanger 36 to provide further cooling to form a cooled hydroprocessed product 218. In some instances, further cooling of the cooled hydroprocessed product 218 may be carried out in the further heat exchanger 40 that does not utilize the feedstock 12 as a cooling fluid. The heat exchanger 40 may be used in lieu of or in addition to the heat exchanger 36. The final cooled hydroprocessed product 220 will typically be at a temperature of from 100° F. to 200° F.

The final cooled hydroprocessed product 220 is then introduced into one or more separators 44. Non-condensable off-gases 222, such as $CO_2$, CO, $H_2S$ and non-condensable hydrocarbons that are produced in the treatment system 202 are separated from the cooled hydroprocessed product 220. The non-condensable hydrocarbon gases that are produced in the reactor system treatment system 202 are separated from the cooled hydroprocessed product 220. The non-condensable hydrocarbon gases may be $C_1$ or greater, but are typically light hydrocarbons of $C_1$ to $C_5$ or $C_6$ hydrocarbons. In one example, at a reaction temperature of 950° F., the non-condensable gases may be from 75% to 80% $CO_2$ and some CO, from 1% to 2% methane, from 6% to 8% ethane, from 4% to 6% propane, from 4% to 5% butane, and from 4% to 5% pentane. Carbon dioxide and CO produced in the reaction may reduce the final liquid hydrocarbon product yield but reduce the amount of water formed.

Liquid water 224 is also separated from the liquid hydrocarbon or oil phase of hydroprocessed product 220. Any metals that have been stripped from the reactor walls of reactor 16 and reactors 18, 20 that are not removed by the separator 208 and are carried in the cooled hydroprocessed product 220 are predominantly distributed in the water phase 224 and thus most of the metals are removed with the water 224. Some metals may also be present with the coke formed in the reactors that is carried in the reactor product. The remaining liquid hydrocarbons 226 from separator 44 may then be introduced into a further stripping unit 52 where stripping gases 228 are used to remove additional non-condensable off-gases 230 that are separated from the liquid hydrocarbons 242. The non-condensable or off-gas composition, and quantity, is dependent on reaction temperature. Also, the amount of off-gas depends on the temperature and pressure of the separator 52. Higher pressure and lower temperatures in the separators 44, 52 results in less off-gas due to the gases remaining in the liquid.

In certain embodiments, all or portions of the off-gases of one or both streams 222, 230 may be fed to a reformer unit 232. Prior to reforming, the off-gases 222, 230 may be purified in in one or more gas scrubber or gas purification units 233 to remove undesirable compounds, such as sulfur-containing compounds (e.g., $H_2S$, $SO_2$, etc.), chorine-containing compounds (e.g., HCl, $Cl_2$, etc.), nitrogen-containing compounds (e.g., NOx, amines, $NH_3$, etc.), and other compounds that may be undesirable or detrimental to the reforming process or catalyst. The purified off-gases 234 with the undesirable compounds removed are then fed to the forming unit 232.

Although a single reformer unit 232 and purification unit 233 are shown for processing both streams 222, 230, second or additional reformer and purification units (not shown) may be provided for purifying and reforming of each of the separate streams 222, 230. The reformer unit 232 may be a steam or autothermal reformer unit and may contain a reforming catalyst. The reformer unit 232 is operated under reforming conditions, including the addition of steam 235, to convert the hydrocarbons from off-gas streams 222, 230 to form hydrogen gas ($H_2$). The product discharge 236 from the reformer unit 232 will typically contain hydrogen gas, CO, $CO_2$, methane and unconverted hydrocarbons. All or a portion of the product discharge 236 from reformer unit 232 may be further processed, such as through a shift conversion unit (not shown) and pressure shift adsorption (PSA) unit (not shown) to increase the hydrogen gas content and/or purify the hydrogen gas stream 236, which may be collected and stored or used in the system 200 or other systems.

All or portions of the reformer product discharge 236 as stream 238 may be combined with or used in lieu of the hydrogen feed 214 that is introduced into the hydroprocessing reactor 204 for the hydroprocessing reaction. Alternatively, all or portions of the product discharge 236 may be collected and stored as stream 240 or be used in the system 200 or other systems.

The separated liquid hydrocarbons 242 are introduced into and pressurized in pump 68. The pressurized liquid hydrocarbons 244 are then filtered in filtering unit 72, such as a cartridge filter or sand filter, to remove coke and any remaining metals and other solids to form the final hydroprocessed product 246.

In some embodiments, all or a portion of the final hydroprocessed product 246 may be delivered to a fractionation unit 248, where the product 246 may be fractionated into various products, such as a naphtha fraction 250, a sustainable aviation fuel fraction 252, and a renewable diesel fraction 254.

In some applications, all or a portion of the final hydroprocessed product 246 may be delivered to a separate isomerization unit 256 under conditions suitable for isomerizing some or all of n-paraffins to iso-paraffins and/or some or all of aromatics to cycloparaffins to provide an isomerized product 258 with a selected pour point, cloud point, freeze point, or other properties. Similarly, all or a portion of the isomerized product 258 may be sent to a fractionation unit 260 where the isomerized product 258 is fractionated into various products, such as a naphtha fraction 262, a sustainable aviation fuel fraction 264, and a renewable diesel fraction 266.

Figure 4:
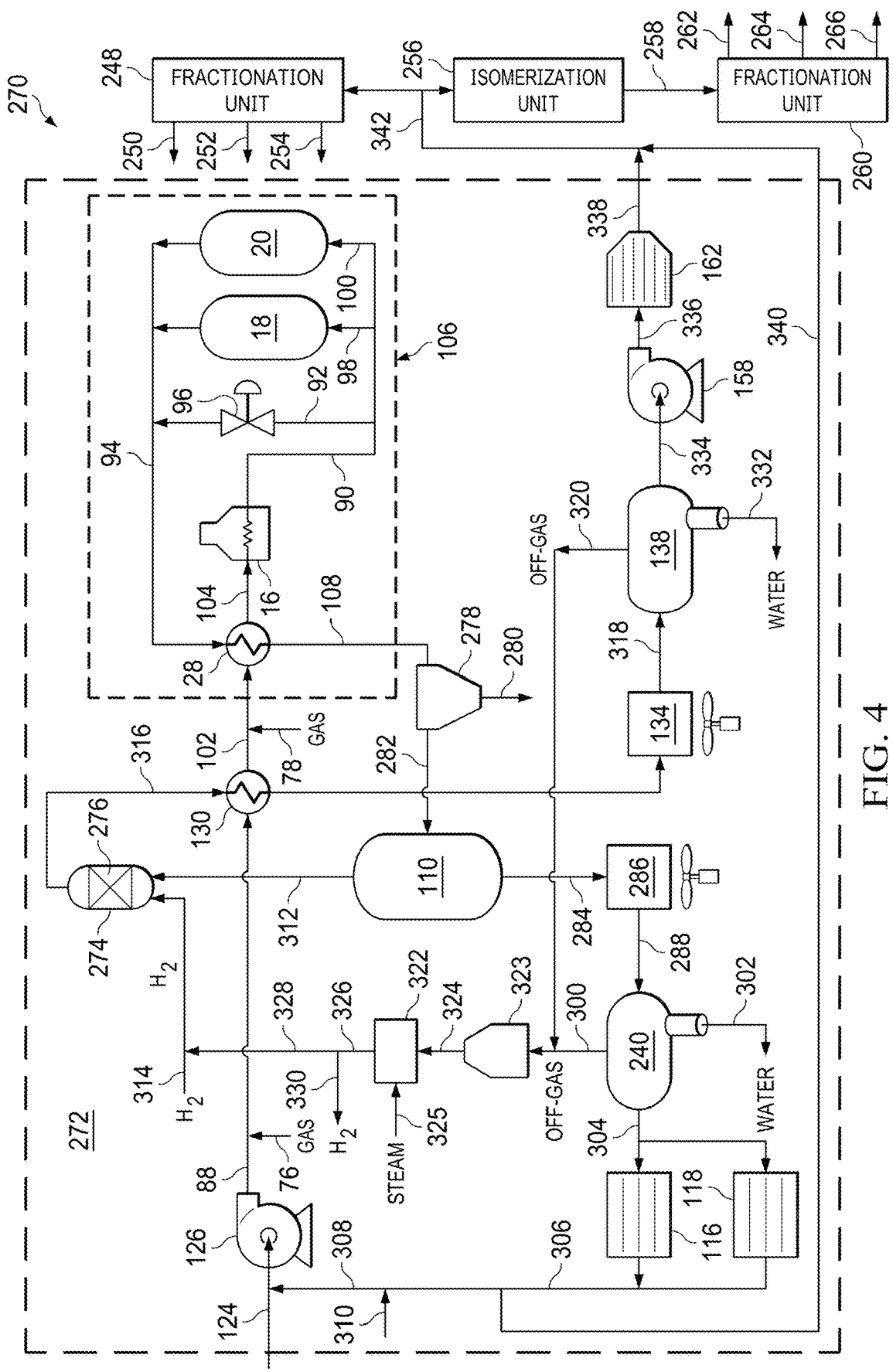
FIG. 4 is a schematic flow diagram of another embodiment of a treatment system for treating a feedstock of animal-derived and/or plant-derived materials that employs both a recycle stream and hydroprocessing reactor.

FIG. 4 shows another treatment system 270 for forming products from a fresh or initial non-petroleum or renewable feedstock, which may be the same or similar to the feedstock 12. This may include animal-derived and/or plant-derived fats and/or oils containing oxygen and contaminants of one or more of metals, gums, and resins, as previously described. The feedstock 12 may also include renewable tank bottoms or other feedstocks containing high amounts (i.e., ≥10 wt %) of gums and/or resins. The feedstock 12 may also be a lignin-containing feedstock. The system 270 is similar to the system 84 of FIG. 2, with similar components labeled with the same reference numerals. The system 270 includes a treatment system 272 for removing oxygen, sulfur, and undesirable materials including metals, gums, and resins from feedstock 88. Process conditions, such as flow rates, pressures, temperatures, etc. are the same or similar to those of system 84, unless otherwise stated. The system 270 differs from the system 84 in that it includes a hydroprocessing reactor 270 used within the treatment system 272. As with the system 200 of FIG. 3, the use of the hydroprocessing reactor 274 within the treatment system 272 may eliminate the need for a stabilization unit and/or isomerization unit, as used with the embodiments of FIGS. 1 and 2. The hydroprocessing reactor 274 saturates olefins and also greatly reduces the final oxygen and sulfur content in the final hydroprocessed product. It also facilitates the reduction or elimination of undesirable odors that may be given off by the products from reactors 16, 18, 20 without their further treatment.

The hydroprocessing reactor 274 includes a catalyst bed 276 containing a hydroprocessing catalyst. The reactor 274 may be configured and operated the same or similarly to the reactor 204 of FIG. 3, containing the same catalyst and operating under the same or similar reaction conditions. In certain instances, the hydroprocessing reactor 274 may be one that is uniquely configured and operated as those hydroprocessing reactors described in U.S. Pat. Nos. 9,096,804; 9,828,552; 10,260,009; 10,487,268; 10,717,938; 10,961,463; and 10,981,142.

The feed for the hydroprocessing reactor 274 is formed from the reduced-temperature reactor product 108 from reactors 16, 18, 20, which may be at a temperature of from 250° F. to 1000° F. In certain embodiments, a cyclone or solids separator 278 may be used to remove any entrained solids 280 from product stream 108 that are carried over from the reactors 16, 18, 20.

The separated reactor product 282 from cyclone 278 is then introduced into liquid/vapor separator 110. In the embodiment of FIG. 4, the still hot separated liquid stream 284 from separator 110 may be passed through a further heat exchanger 286. The separated liquid stream 284 may be cooled in heat exchanger 286 to a temperature of from 100° F. to 200° F. The cooled stream 288 is then introduced into one or more separators 290 where non-condensable off-gases 300 and liquid water 302 are separated from the liquid hydrocarbons, which are discharged from separator 290 as stream 304. Non-condensable off-gases 300 may include $CO_2$, CO, $H_2S$, and non-condensable hydrocarbons, such as $C_1$ to $C_5$ or $C_6$ hydrocarbons.

The stream of separated liquid hydrocarbons 304 is then passed through filter units 116, 118, which may be configured in series or parallel. The filter units 116, 118 are used to filter out coke and any entrained metals and other solids still present in the liquids of stream 304 to form filtered liquid hydrocarbon stream 306.

A portion (e.g., from 10% to 90%) of the filtered liquid stream 306, is used to form recycle stream 308. The recycle stream 308 is combined with a fresh or initial non-petroleum or renewable feedstock 124, which may be the same or similar to the feedstock 12, previously described. The combined fresh feedstock 124 and recycle stream 308 are delivered to pumping unit 126 where they form feedstock 88, which is a combined feedstock of fresh feedstock and recycled product.

In some embodiments, a separate feedstock 310 from the feedstock 124 may be combined with the recycle stream 308. This may be the same or different from the feedstock 124. For instance, the feedstock 124 may be formed primarily from non-petroleum or renewable fats and/or oils, while the feedstock 310 may be from tank bottoms, gums and/or resins removed during feedstock pretreatments, or a feedstock containing high levels (i.e., ≥10 wt %) of gums and/or resins or may be lignin or a lignin-containing feedstock that is added to the recycle stream 308.

The separated vapor phase 312 from product stream 282 that is separated in separator 110 is introduced into the hydroprocessing reactor 274 under reaction conditions suitable for hydroprocessing. All or a portion of the hydrogen necessary for the hydroprocessing reaction may be that residual hydrogen contained in vapor product stream 312 from hydrogen gas introduced as or with the high velocity gas streams 76 and/or 78. In other embodiments, a separate hydrogen feed 314 for the hydroprocessing reaction may be introduced directly into the reactor 274.

The hydroprocessed product 316 from reactor 274 is cooled in heat exchanger 130 and is then introduced into a second cross-heat exchanger 134 to provide further cooling to form a cooled hydroprocessed product 318. The combined fresh and recycle feedstock 88 may also be passed through the heat exchanger 130. The heat exchanger 130 may be configured as a cross heat exchanger, where the "hot" hydroprocessed product stream 316 is used to heat the combined feedstock 88 to form the feed stream 102. Similarly, the combined feed stream 88, which is at a lower temperature than the hydroprocessed product stream 316, may be used for further cooling the hydroprocessed stream 316 to form cooled hydroprocessed product stream 318, where some, but not all, reactor products may be condensed.

In some instances, further cooling of the cooled reactor hydroprocessed product 318 may be carried out in the further heat exchanger 134 that does not utilize the feedstock 88 as a cooling fluid. The heat exchanger 134 may be used in lieu of or in addition to the heat exchanger 130. The final cooled hydroprocessed product 318 will typically be at a temperature of from 100° F. to 200° F.

The final cooled hydroprocessed product 318 is then introduced into one or more separators 138. Non-condensable off-gases 320, such as $CO_2$, CO, $H_2S$, and non-condensable hydrocarbons that are produced in the treatment system 272 are separated from the cooled hydroprocessed product 318. The non-condensable hydrocarbon gases may be $C_1$ or greater, but are typically light hydrocarbons of $C_1$ to $C_5$ or $C_6$. In one example, at a reaction temperature of 950° F., the non-condensable gases may be from 75% to 80% $CO_2$ and some CO, from 1% to 2% methane, from 6% to 8% ethane, from 4% to 6% propane, from 4% to 5% butane, and from 4% to 5% pentane. Carbon dioxide and CO produced in the reaction may reduce the final liquid hydrocarbon product yield.

In certain embodiments, all or portions of the off-gases of stream 320 may be fed to a reformer unit 322. Prior to reforming, the off-gases 300, 320 may be purified in one or more gas scrubbers or gas purification units 323 to remove undesirable compounds, such as sulfur-containing compounds (e.g., $H_2S$, $SO_2$, etc.), chorine-containing compounds (e.g., HCl, $Cl_2$, etc.), nitrogen-containing compounds (e.g., NOx, amines, $NH_3$, etc.), and other compounds that may be undesirable or detrimental to the reforming process or catalyst. The purified off-gases 324 with the undesirable compounds removed are then fed to the reforming unit 232.

Although a single reformer unit 322 and purification unit 323 are shown for processing both streams 300, 320, second or additional reformer and purification units (not shown) may be provided for reforming of each of the separate streams 300, 320. The reformer unit 322 may be a steam or autothermal reformer unit and may contain a reforming catalyst. The reformer unit 322 is operated under reforming conditions, including the addition of steam 324, to convert the hydrocarbons from off-gas streams 300, 320 to form hydrogen gas ($H_2$). The product discharge 326 from the reformer unit 322 will typically contain hydrogen gas, CO, $CO_2$, methane and unconverted hydrocarbons. All or a portion of the product discharge 326 from reformer unit 322 may be further processed, such as through a shift conversion unit (not shown) and pressure shift adsorption (PSA) unit (not shown) to increase the hydrogen gas content and/or purify the hydrogen gas stream 326.

All or portions of the reformer product discharge 326 as stream 328 may be combined with or used as the hydrogen feed 314 that is introduced into the hydroprocessing reactor 274 to supply hydrogen gas for the hydroprocessing reaction, along with any hydrogen gas in stream 312 from separator 110. Alternatively, all or portions of the product discharge 326 may be collected and stored as stream 330 or be used in the system 270 or other systems.

Liquid water 332 is also separated from the liquid hydrocarbon or oil phase of the cooled hydroprocessed product 318. Metals that have been stripped from the reactor walls of reactor 16 and reactors 18, 20 that are carried in the cooled product 318, which have not been removed through separators 278, 290, are predominantly distributed in the water phase 332 and thus most of the metals are removed with the water 332. The remaining liquid hydrocarbons 334 are introduced into and pressurized in pump 158. Although not shown, a stripping unit, such as the stripping unit 52 of FIG. 3, may also be used with system 270 to remove additional light gases from the stream 334 before the liquid hydrocarbons are introduced into the pump 158. The pressurized liquid hydrocarbons 336 may then be filtered in filtering unit 162, such as a cartridge filter or sand filter, to remove any coke and remaining metals and other solids in the product stream 336 to form filtered liquid product stream 338.

The portion of the filtered liquid product stream 306 that is not recycled as recycle stream 308 may be combined as liquid product stream 340 with the liquid hydroprocessed product stream 338 to from the final treated product 342.

In some embodiments, all or a portion of the final treated product 342 may be delivered to a fractionation unit 248, where the product 342 may be fractionated into various products, such as a naphtha fraction 250, a sustainable aviation fuel fraction 252, and a renewable diesel fraction 254.

In some applications, all or a portion of the final hydroprocessed product 342 may be delivered to a separate isomerization unit 256, which may be the same or similar to the isomerization unit 174, under conditions suitable for isomerizing some or all of n-paraffins to iso-paraffins and/or some or all of aromatics to cycloparaffins to provide an isomerized product 258 with a selected pour point, cloud point, freeze point, or other properties. Similarly, all or a portion of the isomerized product 258 may be sent to a fractionation unit 260 where the isomerized product 258 is fractionated into various products, such as a naphtha fraction 262, a sustainable aviation fuel fraction 264, and a renewable diesel fraction 266.

The final treated products 74, 168, 246, and 342 from each treatment system 10, 84, 200, and 270 of FIGS. 1-4, respectively, have unique characteristics. As discussed earlier, the gum and resin content of the initial feedstock is significantly reduced or eliminated entirely, with the gum and resins being converted into useful products or other non-detrimental compounds. In most instances, in the final products, virtually no detectable solids indicating the presence of gums and resins in the final product are found. Moreover, the product can be further processed in a renewable diesel unit without causing problems of plugging.

Metals are also removed so that from 90% to 99.9% to even 100% of the metals in the initial feedstock are removed. The final product may therefore have very little or no metals. If any metals do remain in the final product, such remaining metal contaminants may be present in the final product in an amount from only 0.00001 ppm to 100 ppm by total weight of the product. In certain embodiments, the total metal contaminants may be present in the final product in an amount from at least, equal to, and/or between any two of 0 ppm, 0.00001 ppm, 0.0001 ppm, 0.001 ppm, 0.01 ppm, 0.1 ppm, 0.5 ppm, 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, and 100 ppm by total weight of the product.

The final products 74, 168, 246, 342 may have a specific gravity of from 0.73 to 0.88, and a viscosity of from 0.5 cSt to 5 cSt. In certain embodiments, the final product may have a specific gravity of from at least, equal to, and/or between any two of 0.73, 0.74, 0.75, 0.76, 0.77, 0.78, 0.79, 0.80, 0.81, 0.82, 0.83, 0.84, 0.85, 0.86, 0.87, and 0.88. And the final product may have a viscosity of from at least, equal to, and/or between any two of 0.5 cSt, 0.6 cSt, 0.7 cSt, 0.8 cSt, 0.9 cSt, 1.0 cSt, 1.1 cSt, 1.2 cSt, 1.3 cSt, 1.4 cSt, 1.5 cSt, 1.6 cSt, 1.7 cSt, 1.8 cSt, 1.9 cSt, 2.0 cSt, 2.1 cSt, 2.2 cSt, 2.3 cSt, 2.4 cSt, 2.5 cSt, 2.6 cSt, 2.7 cSt, 2.8 cSt, 2.9 cSt, 3.0 cSt, 3.1 cSt, 3.2 cSt, 3.3 cSt, 3.4 cSt, 3.5 cSt, 3.6 cSt, 3.7 cSt, 3.8 cSt, 3.9 cSt, 4.0 cSt, 4.1 cSt, 4.2 cSt, 4.3 cSt, 4.4 cSt, 4.5 cSt, 4.6 cSt, 4.7 cSt, 4.8 cSt, 4.9 cSt, and 5.0 cSt.

In the case of the products 246, 342 that have undergone hydroprocessing, the final products 209, 342 may have a specific gravity of from 0.75 to 0.80, a viscosity of from 0.5 cSt to 2 cSt. The pour point of the hydroprocessed products 246, 342 may be from 35° F. or less. In certain embodiments, the hydroprocessed products 246, 342 may have a specific gravity of from at least, equal to, and/or between any two of 0.75, 0.74, 0.75, 0.76, 0.77, 0.78, 0.79, and 0.80. And the hydroprocessed products 209, 342 may have a viscosity of from at least, equal to, and/or between any two of 0.5 cSt, 0.6 cSt, 0.7 cSt, 0.8 cSt, 0.9 cSt, 1.0 cSt, 1.1 cSt, 1.2 cSt, 1.3 cSt, 1.4 cSt, 1.5 cSt, 1.6 cSt, 1.7 cSt, 1.8 cSt, 1.9 cSt, and 2.0 cSt.

The final oxygen content of the final products 74, 168, 246, 342 will typically be from 6%, 5%, 4%, 3%, 2%, 1%, 0.5% or less by total weight of the final product. In certain embodiments, the oxygen content may be present in the final products 74, 168, 246, 342 in an amount from at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, and 10.0 wt % by total weight of the final product.

The final products 74, 168, 246, 342 may also be composed of from 25 wt %, 20 wt %, 15 wt %, 10 wt %, or 5 wt % or less of any triglycerides, monoglycerides, diglycerides, free fatty acids, phosphatides, sterols, tocopherols, tocotrienols, and fatty alcohols, from 5 wt % to 30 wt % naphtha, 50 wt % or more of diesel, and from 5 wt % or less olefins. In particular embodiments, the total amount of compounds of triglycerides, monoglycerides, diglycerides, free fatty acids, phosphatides, sterols, tocopherols, tocotrienols, and fatty alcohols may be present in the final product in an amount from at least, equal to, and/or between any two of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, and 25 wt % by total weight of the final product.

Naphtha may be present in the final product in an amount from 5 wt % to 30 wt % by total weight of the final products 74, 168, 246, 342. As used herein, unless otherwise stated, "naphtha" may be generally defined as that hydrocarbon fraction having Reid vapor pressure of 10 psi or less and a final boiling point of 330° F. or less at 1 atmosphere. In certain applications, naphtha may be present in the final products 74, 168, 246, 342 in an amount from at least, equal to, and/or between any two of 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt % by total weight of the final product.

Renewable jet fuel or sustainable aviation fuel (SAF) may be present in the final products 74, 168, 246, 342 in an amount of from 5 wt % to 50 wt %. In particular instances, the sustainable aviation fuel fraction may be present in the final products 74, 168, 246, 342 at from at least, equal to, and/or between any two of 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the final product.

Diesel may be present in the final products 74, 168, 246, 342 in an amount from 50 wt % or more by total weight of the final product. As used herein, unless otherwise stated, "diesel" may be generally defined as that hydrocarbon fraction having a flash point of below 125° F. with 90% of the composition having a boiling point of 640° F. or less at 1 atmosphere. In some embodiments, diesel may be present in the final products 74, 168, 246, 342 from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, and 90 wt % by total weight of the final product.

Olefins may be present in the final products 74, 168, 246, 342 in an amount of from 5 wt % or less. In particular instances, olefins may be present in the final product 74 or 168 from at least, equal to, and/or between any two of 0 wt %, 0.1 wt %, 0.2 wt %, 0.3 wt %, 0.4 wt %, 0.5 wt %, 0.6, 0.7, 0.8, 0.9, 1.0, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, and 5.0 wt % by total weight of the final product.

In many instances, the final products 74, 168, 246, 342 from each of the treatment systems 10, 84, 200, 270, respectively, may meet the requirements of ASTM D975 for renewable diesel without requiring further processing, such as hydroprocessing, isomerization, or fractionation. In other instances, the final products may undergo one or more or all of hydroprocessing, isomerizing, or fractionation regardless of whether or not it meets the requirements of ASTM D975 for renewable diesel. In some cases, the final products 74, 168, 246, 342 may at least undergo fractionation or both hydroprocessing and fractionation, in either order, to obtain renewable diesel that meets the requirements of ASTM D975.

In certain cases, the products 74, 168, 246, 342 from any of the systems 10, 84, 200, 270 may be used as a feedstock for further processes. Each of the systems 10, 84, 200, 270 may thus include a further stabilization unit, such as the stabilization unit 170 where the products 74, 168 of FIGS. 1 and 2 are stabilized to form a stabilized product 172. This may include hydroprocessing, where the stabilization unit 170 includes a reactor containing a hydroprocessing catalyst that is contacted by the products 74, 168 in the presence of hydrogen under conditions suitable for hydroprocessing.

The stabilized product 172 may have a specific gravity of from 0.75 to 0.80, a viscosity of from 0.5 cSt to 2 cSt, and an oxygen content of 0.2 wt % or less. The pour point of the stabilized product may be from 35° F. or less. In certain embodiments, the stabilized product 172 may have a specific gravity of from at least, equal to, and/or between any two of 0.75, 0.74, 0.75, 0.76, 0.77, 0.78, 0.79, and 0.80. And the stabilized product 172 may have a viscosity of from at least, equal to, and/or between any two of 0.5 cSt, 0.6 cSt, 0.7 cSt, 0.8 cSt, 0.9 cSt, 1.0 cSt, 1.1 cSt, 1.2 cSt, 1.3 cSt, 1.4 cSt, 1.5 cSt, 1.6 cSt, 1.7 cSt, 1.8 cSt, 1.9 cSt, and 2.0 cSt.

In certain embodiments, all or a portion of the stabilized product 172 may be delivered to a separate isomerization unit 174, which may be provided with the systems 10, 84, under conditions suitable for isomerizing some or all of n-paraffins to iso-paraffins and/or some or all of aromatics to cycloparaffins or naphthenic compounds to provide an isomerized product 176 with a selected pour point, cloud point, freeze point, or other properties.

In some embodiments, all or a portion of the stabilized product 172 that has not been isomerized may be directed to a fractionation unit 182 of each of the systems 10, 84, where the product 172 may be fractionated into various products, such as a naphtha fraction 184, a sustainable aviation fuel fraction 186, and a renewable diesel fraction 188. Similarly, all or a portion of the isomerized product 176 may be sent to a fractionation unit 190 of each of the systems 10, 84, where the isomerized product 176 is fractionated into various products, such as a naphtha fraction 192, a sustainable aviation fuel fraction 194, and a renewable diesel fraction 196.

In the case of the systems 200, 270 of FIGS. 3 and 4, which utilize a hydroprocessing reactor to form the final products 246, 342, respectively, the final products 246, 342 may undergo no further stabilization or isomerization. The products 246, 342 may have similar characteristics to those products 74, 168 of systems 10, 84 that have undergone stabilization and/or isomerization. The final products 246, 342 may be further fractionated into various products, such as fractionated into various products, such as a naphtha fraction 250, a sustainable aviation fuel fraction 252, and a renewable diesel fraction 254.

While the products may undergo hydroprocessing, stabilization and/or separate isomerization, as in a conventional renewable diesel process, it should be distinguished from hydroprocessing and isomerization that are utilized in conventional renewable diesel processing systems.

Because the product from the treatment systems 10, 84, 200, 270 has a significantly lower oxygen content than conventional renewable diesel feedstocks, the amount of hydrogen necessary for further hydroprocessing is significantly lower. For example, in a conventional renewable diesel hydrotreating system, a typical amount of hydrogen gas ($H_2$) necessary for a given feedstock may be around from 1,500 scf/bbl to 4,000 scf/bbl. Utilizing the products 74, 168, 246, 342 derived from the same initial feedstock as a feedstock for hydroprocessing, the amount of hydrogen gas required may be reduced from 30% to 90%. Thus, for example, while 3000 scf/bbl of hydrogen gas may be needed for treating a given feedstock in a conventional renewable diesel unit, the amount of hydrogen gas needed for stabilizing the products 74, 168, 246, 342 derived from the same initial feedstock may be from 300 scf/bbl to 1500 scf/bbl to form a similar or comparable product. Additionally, the operating pressure for hydroprocessing in a conventional renewable diesel unit may be much higher, at around 900 psi or more. To form a comparable product utilizing the treated initial feedstock in the stabilization unit 170, the operating pressure may be around 300 psi. Because plant costs increase linearly with respect to operating pressure, reducing the operating pressure for a given process can lower the plant construction costs considerably.

In some embodiments, the stabilization unit 170 used for hydroprocessing the products 74, 168 may be a liquid-phase hydroprocessing reactor system that utilizes a liquid diluent combined with the feedstock for dissolving the necessary hydrogen for reaction. Such hydroprocessing systems and methods are described in U.S. Pat. Nos. 9,096,804; 9,828,552; 10,487,268; 10,961,463 and 10,981,142, each of which is hereby incorporated herein by reference in its entirety for all purposes. Alternatively, the stabilization unit 170 can be configured as a conventional hydroprocessing unit, similar to a conventional renewable diesel unit, where large volumes of hydrogen gas are circulated in the reactor along with the feedstock. In contrast to conventional hydroprocessing or hydrotreating units, the stabilization unit 170 will typically require significantly less hydrogen and significantly lower reactor pressures than conventional processing equipment.

Additionally, because most of the oxygen is removed from the products 74, 168, 246, 342, less water is produced in the stabilization unit 170 so there is no danger of water damage to the hydroprocessing catalyst or the creation of a separate water phase.

With respect to isomerization, the products from conventional renewal diesel plants typically contain a significant amount of waxes or n-paraffins and may, for example, have a cloud point of around 70° F., as measured by ASTM 2500. Given the same initial feedstocks, the products 172 of treatment systems 10 and 84 hydrotreated in the stabilization unit 170 are significantly different from those hydrotreated in a conventional renewable diesel unit. Even after hydrotreating in the stabilization unit 170, there are fewer waxes or n-paraffins in the stabilized product 172. The stabilized product 172 will typically have a cloud point of from 35° F., 30 F, 25, 20° F., or 15 OF or less, as measured by ASTM 2500, without any isomerization treatment. This is considerably lower than the hydrotreated product from a conventional renewable diesel unit.

One of the advantages of the treatment method and systems 10, 84, 200, 270 is to help in lowering GHG emissions. Not only do the methods and systems utilize a renewable feedstock, which has a lower environmental impact, but assuming the feedstocks received by the systems 10, 84, 200, 270 have a CI score of zero, the stabilized products 172 produced from the systems 10, 84 and final products 246, 342 of systems 200, 270 meet the criteria of renewable diesel but will have a CI score of 10 g/MJ or less, as established by the criteria of California LCFS of 2018. This is based upon natural gas fuel usage for the reactors 16, 18, 20 and power consumption for the various powered equipment utilized to operate the systems 10, 84, 200, 270. Power consumption for calculating the CI value includes the power used to operate pumping units for the initial feedstock (e.g., pump 126), pumping units for the product (e.g., pumping units 68, 158), and forced convection heat exchangers (e.g., heating exchangers 40, 134). The hot reaction product of the system facilitates heating of the renewable feedstock, and the renewable feedstock facilitates cooling of the hot reaction products. And using combustible off-gases as fuel for the systems 10, 84 helps to reduce CI further. In certain embodiments, the stabilized products 172 will have a CI score of 10 g/MJ, 9 g/MJ, 8 g/MJ, 7 g/MJ, 6 g/MJ, 5 g/MJ, 4 g/MJ, or 3 g/MJ or less. This is contrasted with conventional renewable diesel products that, even assuming a feedstock with an initial CI score of zero, will still typically have a CI of around 20 g/MJ.

In particular embodiments, any one of the systems 10, 84, 200, 270 may be used in the conversion of non-petroleum or renewable feedstocks that contain high amounts of gums and/or resins, i.e., ≥10 wt % by total weight of the feedstock. These high-gum and/or resin-containing feedstocks may be those from renewable tank bottoms or gums and/or resins that have been previously removed or separated from non-petroleum or renewable materials in a pretreatment for their removal. The high-gum and/or resin-content feedstock may be a high-gum-content feedstock containing primarily gums with little or no resin. The total gum and/or resin content of such high-gum and/or resin-content feedstocks may be from 10 wt % or more by total weight of the feedstock, with from 10 wt % to 30 wt % being typical. In such instances where the gum and/or resin content is higher, the total gums and/or resins may be present in the feedstock in an amount from at least, equal to, and/or between any two of 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt % by total weight of the feedstock.

Like other non-petroleum or renewable feedstocks, the high-gum and/or resin-content feedstock may have an oxygen content of 8 wt % or more. In certain embodiments, the oxygen content may be present in the high-gum and/or resin-content feedstock in an amount from at least, equal to, and/or between any two of 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, and 40 wt %, 41 wt %, 42 wt %, 43 wt %, 44 wt %, 45 wt %, 46 wt %, 47 wt %, 48 wt %, 49 wt %, and 50 wt % by total weight of the feedstock.

The high-gum and/or resin-content feedstocks may have a metal content, such as those metals described previously, from a few parts (e.g., 0.1 ppm) per million by weight (ppm) of feedstock to several thousand ppm (e.g., 5,000 ppm or more) by total weight of feedstock. In certain embodiments, the total metal contaminants may be present in the feedstock in an amount from at least, equal to, and/or between any two of 0.1 ppm, 0.5 ppm, 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1200 ppm, 1250 ppm, 1300 ppm, 1350 ppm, 1400 ppm, 1450 ppm, 1500 ppm, 1550 ppm, 1600 ppm, 1650 ppm, 1700 ppm, 1750 ppm, 1800 ppm, 1850 ppm, 1900 ppm, 1950 ppm, 2000 ppm, 2050 ppm, 2100 ppm, 2150 ppm, 2200 ppm, 2200 ppm, 2250 ppm, 2300 ppm, 2350 ppm, 2400 ppm, 2450 ppm, 2500 ppm, 2550 ppm, 2600 ppm, 2650 ppm, 2700 ppm, 2750 ppm, 2800 ppm, 2850 ppm, 2900 ppm, 2950 ppm, 3000 ppm, 3050 ppm, 3100 ppm, 3150 ppm, 3200 ppm, 3200 ppm, 3250 ppm, 3300 ppm, 3350 ppm, 3400 ppm, 3450 ppm, 3500 ppm, 3550 ppm, 3600 ppm, 3650 ppm, 3700 ppm, 3750 ppm, 3800 ppm, 3850 ppm, 3900 ppm, 3950 ppm, 4000 ppm 4050 ppm, 4100 ppm, 4150 ppm, 4200 ppm, 4200 ppm, 4250 ppm, 4300 ppm, 4350 ppm, 4400 ppm, 4450 ppm, 4500 ppm, 4550 ppm, 4600 ppm, 4650 ppm, 4700 ppm, 4750 ppm, 4800 ppm, 4850 ppm, 4900 ppm, 4950 ppm, and 5000 ppm by total weight of the feedstock.

Such high-gum and/or resin-content feedstocks can be used to make sustainable aviation or jet fuel that meets many of the properties of ASTM D7566-21 for sustainable aviation fuel. The sustainable aviation fuel produced from these high-gum and/or high-resin feedstocks may have any one or all of a freeze point of −40° F. or less, as measured by ASTM D2386, a flash point of at least 100° F., as measured by ASTM D93, and a boiling end point of at least 300° C. (572° F.), as measured by ASTM D86. This properties may be met for the sustainable aviation fuel product that does not contain any petroleum component.

The processing of high-gum and/or resin-content feedstocks is the same or similar to that described previously for each of the systems 10, 84, 200, 270 at the same or similar operating conditions. When treated in such systems, the final products, such as at 74, 168, 246, 342, may have a gum and/or resin content reduced by 10 wt % to 100 wt % by weight of the initial gum and resin content of the high-gum and/or resin-content feedstock. In certain embodiments, the gum and resin content of the high-gum and/or resin-content feedstock can be reduced by an amount of at least, equal to, and/or between any two of 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% by weight of the initial gum and resin content of the feedstock.

The final product formed from the high-gum and/or resin-content feedstock, which may be a non-hydroprocessed final product, such as the final products 74, 168 of systems 10, 84, respectively, or a hydroprocessed final product, such as the final products 246, 342 of systems 200, 270, respectively, may have an oxygen content that is 60%, 50%, 40%, 30%, 20%, 10% or less of that of the feedstock.

The non-hydroprocessed final product from the high-gum and/or resin-content feedstock, such as products 74, 168, will typically have a higher oxygen content than the hydroprocessed final product, such as the products 246, 342 of systems 200, 272. The non-hydroprocessed final product, such as products 74, 168 of systems 10, 84, may have oxygen-containing compounds, which may be in the form of alcohols, acids, triglycerides, ketones, and aldehydes. These can be removed through further hydroprocessing, such as in the stabilization unit 170.

Where the final product formed from the non-petroleum or renewable feedstocks, such as those from high-gum and/or resin-content feedstocks and/or lignin-containing feedstocks, is hydroprocessed to form a hydroprocessed product, such as the products 172 from stabilization unit 170 of systems 10, 84, or the products 246, 342 from systems 200, 270, respectively, the hydroprocessed product may have from 1 wt %, 0.9 wt %, 0.8 wt %, 0.7 wt %, 0.6 wt %, 0.5 wt, 0.4 wt %, 0.3 wt %, 0.2 wt %, 0.1 wt %, 0.09 wt %, 0.08 wt %, 0.07 wt %, 0.06 wt %, 0.05 wt %, 0.04 wt %, 0.03 wt %, 0.02 wt %, or 0.01 wt %, 0.009 wt %, 0.008 wt %, 0.007 wt %, 0.006 wt %, 0.005 wt %, 0.004 wt %, 0.003 wt %, 0.002 wt %, 0.001% or less oxygen by weight of the hydroprocessed product.

In many embodiments, the final product 74, 168, 246, 342 may be isomerized. This may be used to convert straight-chain or n-paraffins, which have relatively high freeze points, to branched paraffins, which have much lower freeze points. The reduction of n-paraffin content facilitates making the resulting product suitable for use in aviation or jet fuels, that require low freeze points of −45° F. or less. Aromatics may also be isomerized to form cycloparaffins.

The isomerization of the hydroprocessed final product 246, 342 from systems 200, 270 may be isomerized in isomerization unit 256 to form the isomerized product 258. Similarly, the final product 74 from systems 10, 84, which may be a non-hydroprocessed product 178 or a hydroprocessed product 172 from stabilization unit 170, may also be isomerized in isomerization unit 174.

In certain applications, the isomerized products 176, 258, which may include those formed from high-gum and/or resin-content feedstocks and/or lignin-containing feedstocks, may be fractionated in fractionation units 190, 260, respectively. This fractionates the isomerized products 176, 258 into various refined products, such as the naphtha fractions 192, 262, the sustainable aviation fuel fractions 194, 264, and the renewable diesel fractions 196, 266.

Alternatively, the final products 74 (systems 10, 84) and final products 246, 342 (systems 200, 270) formed from high-gum and/or resin-content feedstock may be introduced into fractionation units 182, 248, respectively, without isomerization. This fractionates the final products 74, 246, 248 into various refined products, such as the naphtha fractions 184, 250, the sustainable aviation fuel fractions 186, 252, and the renewable diesel fractions 188, 254.

The composition of those products, which may be fuel composition products, formed from the non-petroleum and renewable feedstocks, including the high-gum and/or resin-content feedstocks and/or lignin-containing feedstocks, may have aromatic compounds in an amount of from 0 wt % to 100 wt % by total weight of the product, more particularly from 10 wt % to 100 wt % by total weight of the product. In some embodiments, the aromatic content may be from at least, equal to, and/or between any two of 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, and 100 wt % by total weight of the product. This includes those products that have been hydroprocessed, stabilized, isomerized, and/or fractionated.

The composition of those products, which may be fuel composition products, formed from the non-petroleum and renewable feedstocks, including the high-gum and/or resin-content feedstocks and/or lignin-containing feedstocks, may have an isoparaffin content in an amount of from 0 wt % to 100 wt % by total weight of the product, more particularly from 0 wt % to 90 wt % by total weight of the product. In some embodiments, the isoparaffin content may be from at least, equal to, and/or between any two of 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, and 100 wt % by total weight of the product. This includes those products that have been hydroprocessed, stabilized, isomerized, and/or fractionated.

The composition of those products, which may be fuel composition products, formed from the non-petroleum and renewable feedstocks, including the high-gum and/or resin-content feedstocks and/or lignin-containing feedstocks, may have an n-paraffin content in an amount of from 0 wt % to 100 wt % by total weight of the product, more particularly from 0 wt % to 90 wt % by total weight of the product. In some embodiments, the n-paraffin content may be from at least, equal to, and/or between any two of 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, and 100 wt % by total weight of the product. This includes those products that have been hydroprocessed, stabilized, isomerized, and/or fractionated.

The composition of those products, which may be fuel composition products, formed from the non-petroleum and renewable feedstocks, including the high-gum and/or resin-content feedstocks and/or lignin-containing feedstocks, may have a cycloparaffin or naphthenic compound content in an amount of from 0 wt % to 100 wt % by total weight of the product, more particularly from 0 wt % to 90 wt % by total weight of the product. In some embodiments, the cycloparaffin or naphthenic compound content may be from at least, equal to, and/or between any two of 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, and 100 wt % by total weight of the product. This includes those products that have been hydroprocessed, stabilized, isomerized, and/or fractionated.

The composition of those products, which may be fuel composition products, formed from the non-petroleum and renewable feedstocks, including the high-gum and/or resin-content feedstocks and/or lignin-containing feedstocks, can have a carbon-14 ($^{14}C$) to carbon-12 ($^{12}C$) isotope ratio of $1.35 \times 10^{-12}$, as determined by Accelerator Mass Spectrometry (AMS). This includes those products that have been hydroprocessed, stabilized, isomerized, and/or fractionated.

In some cases, the products formed from the non-petroleum and renewable feedstocks, including the high-gum and/or resin-content feedstocks and/or lignin-containing feedstocks, may be mixed with petroleum products to form a blend, such as a 50/50 by blend by weight. In such cases the blend product may have a carbon-14 ($^{14}C$) to carbon-12 ($^{12}C$) isotope ratio of from $1.00 \times 10^{-15}$ to $1.35 \times 10^{-12}$, more particularly from $6.75 \times 10^{-13}$, as determined by Accelerator Mass Spectrometry. In some embodiments, the product may have a carbon-14 ($^{14}C$) to carbon-12 ($^{12}C$) isotope ratio of from at least, equal to, and/or between any two of $1.00 \times 10^{-15}$, $2.00 \times 10^{-15}$, $3.00 \times 10^{-15}$, $4.00 \times 10^{-15}$, $5.00 \times 10^{-15}$, $6.00 \times 10^{-15}$, $7.00 \times 10^{-15}$, $8.00 \times 10^{-15}$, $9.00 \times 10^{-15}$, $1.00 \times 10^{-14}$, $2.00 \times 10^{-14}$, $3.00 \times 10^{-14}$, $4.00 \times 10^{-14}$, $5.00 \times 10^{-14}$, $6.00 \times 10^{-14}$, $7.00 \times 10^{-14}$, $8.00 \times 10^{-14}$, $9.00 \times 10^{-14}$, $1.00 \times 10^{-13}$, $2.00 \times 10^{-13}$, $3.00 \times 10^{-13}$, $4.00 \times 10^{-13}$, $5.00 \times 10^{-13}$, $5.50 \times 10^{-13}$, $6.00 \times 10^{-13}$, $6.25 \times 10^{-13}$, $6.50 \times 10^{-13}$, $6.75 \times 10^{-13}$, $7.00 \times 10^{-13}$, $7.25 \times 10^{-13}$, $7.50 \times 10^{-13}$, $7.75 \times 10^{-13}$, $8.00 \times 10^{-13}$, $8.25 \times 10^{-13}$, $8.50 \times 10^{-13}$, $8.75 \times 10^{-13}$, $9.00 \times 10^{-13}$, $9.25 \times 10^{-13}$, $9.50 \times 10^{-13}$, $9.75 \times 10^{-13}$, $1.00 \times 10^{-12}$, $1.05 \times 10^{-12}$, $1.10 \times 10^{-12}$, $1.15 \times 10^{-12}$, $1.20 \times 10^{-12}$, $1.25 \times 10^{-12}$, $1.30 \times 10^{-12}$, $1.31 \times 10^{-12}$, $1.32 \times 10^{-12}$, $1.33 \times 10^{-12}$, $1.34 \times 10^{-12}$, and $1.35 \times 10^{-12}$, as determined by Accelerator Mass Spectrometry.

Those sustainable aviation fuel products formed from the processes described herein, including those formed from high-gum and/or resin-content feedstocks, may meet many of the requirements of ASTM D7566-21 for sustainable aviation fuel. Such renewable or sustainable aviation or jet fuel products may have a freeze point of −40° F. or less, −45° F. or less, −50° F. or less, or −55° F. or less, as measured by ASTM D2386. In particular embodiments, the renewable or sustainable aviation or jet fuel products may have a freeze point of −40° F. or less, −41° F. or less, −42° F. or less, −43° F. or less, −44° F. or less, −45° F. or less, −46° F. or less, −47° F. or less, −48° F. or less, −49° F. or less, −50° F. or less, −51° F. or less, −52° F. or less, −53° F. or less, −54, or −55° F. or less, as measured by ASTM D2386.

Additionally, the sustainable aviation fuel products produced may have a flash point of 100 OF or more, as measured by ASTM D93. The sustainable aviation fuel products produced may further have a boiling end point of at least 300° C. (572° F.), as measured by ASTM D86.

In some instances, the sustainable aviation fuel products formed from the processes described herein, including those formed from high-gum and/or resin-content feedstocks and/or lignin-containing feedstocks, may be blended with at least 50 wt % of a petroleum component. This will typically be a petroleum aviation fuel component to meet current requirements for commercial aircraft.

The following examples serve to further illustrate various embodiments and applications.

EXAMPLES

Example 1

Tank bottoms from distiller's corn oil having high gums, resins, water and metals content was treated at 600 psig and 900° F. through a fired heater for a period of a few seconds in a laboratory pilot plant. The treated product was cooled to separate the water and off-gas from the hydrocarbon phase. The final product contained trace amounts of water, 4 wt % off-gas and 96 vol % hydrocarbon liquids. The hydrocarbon liquids contained 19 vol % naphtha and 77 vol % percent diesel relative to the feed.

While the invention has been shown in only some of its forms, it should be apparent to those skilled in the art that it is not so limited but is susceptible to various changes and modifications without departing from the scope of the invention. Accordingly, it is appropriate that the invention be construed broadly.

We claim:

1. A method of treating non-petroleum or renewable feedstock containing lignins, the method comprising:
   introducing a lignin-containing feedstock into a reactor at a flow velocity of from 20 ft/sec to 100 ft/sec, the feedstock being heated within the reactor to a temperature of from 700° F. to 1100° F. to convert the lignin-containing feedstock into a reactor product;
   cooling the reactor product to form a cooled reactor product; and
   separating and removing at least one of gases, metals, and water from the cooled reactor product to form a final product, the final product having a lignin content that is reduced by 10% to 100% by weight of the initial lignin incorporated into the feedstock.

2. The method of claim 1, wherein:
   the lignin-containing feedstock comprises lignin incorporated into a non-petroleum or renewable liquid component.

3. The method of claim 1, wherein:
   the initial amount of lignins incorporated into the feedstock ranges from 1 wt % or more by total weight of the feedstock.

4. The method of claim 1, wherein:
   the initial amount of lignins incorporated into the feedstock ranges from 20 wt % to 80 wt % by total weight of the feedstock.

5. The method of claim 1, wherein:
   the lignin-containing feedstock comprises lignin and at least one of cellulose and hemicellulose.

6. The method of claim 1, further comprising:
   at least one of hydroprocessing and fractionating the final product.

7. The method of claim 1, wherein:
   the final product is hydroprocessed to form a hydroprocessed product having an oxygen content that is 0.1% or less of that of the lignin-containing feedstock.

8. The method of claim 1, wherein:
   the final product has a specific gravity of from 0.73 to 0.88, a viscosity of from 0.5 cSt to 5 cSt, and an oxygen content of 6 wt % or less without further treatment.

9. The method of claim 1, wherein:
   the final product has a diesel content of from 50% or more by weight of the final product.

10. The method of claim 1, wherein:
    the final product has a pour point of 40° F. or less without further treatment.

11. The method of claim 1, further comprising:
    fractionating and hydroprocessing at least a portion of the final product to form a refined product comprising at least one of a naphtha fraction, a sustainable aviation fuel fraction, and a renewable diesel fraction.

12. The method of claim 11, wherein:
    the refined product comprises a renewable diesel fraction that meets the requirements of ASTM D975 for renewable diesel.

13. The method of claim 1, wherein:
    lignin of the lignin-containing feedstock is derived from paper manufacturing.

14. A method of treating non-petroleum or renewable feedstock containing lignins, the method comprising:
    introducing a lignin-containing feedstock from a non-petroleum or renewable source containing one or more of metals, gums and/or resins into a reactor at a flow velocity of from 20 ft/sec to 100 ft/sec, the lignin-containing feedstock being heated within the reactor to a temperature of from 700° F. to 1100° F. to convert the gums into a reactor product;
    cooling the reactor product to form a cooled reactor product; and
    separating and removing gases, metals, and water from the cooled reactor product to form a final product, the final product having a lignin content that is reduced by 10% to 100% by weight of the initial lignin incorporated into the feedstock.

15. The method of claim 14, wherein:
    the initial amount of lignins incorporated into the feedstock ranges from 1 wt % or more by total weight of the feedstock, with gums and/or resins being present in the feedstock in a total amount of from 10 wt % or more by total weight of the feedstock.

16. The method of claim 14, wherein:
    the initial amount of lignins incorporated into the feedstock ranges from 20 wt % to 80 wt % by total weight of the feedstock.

17. The method of claim 14, further comprising:
    at least one of hydroprocessing and fractionating the final product.

18. The method of claim 14, wherein:
    the final product is hydroprocessed to form a hydroprocessed product having an oxygen content that is 0.1% or less of that of the lignin-containing feedstock.

19. The method of claim 14, further comprising:
    the final product has a specific gravity of from 0.73 to 0.88, a viscosity of from 0.5 cSt to 5 cSt, and an oxygen content of 6 wt % or less without further treatment.

20. The method of claim 14, wherein:
    the final product has a diesel content of from 50% by weight of the final product.

* * * * *